US012094203B1

(12) United States Patent
Doke et al.

(10) Patent No.: US 12,094,203 B1
(45) Date of Patent: Sep. 17, 2024

(54) TECHNIQUES FOR STORING IMAGES DEPICTING IDENTIFIERS

(71) Applicant: Amazon Technologies, Inc., Seattle, WA (US)

(72) Inventors: Abhay Doke, Framingham, MA (US); Ejaz Ahmed, Marlborough, MA (US); Austen Groener, Hudson, MA (US)

(73) Assignee: Amazon Technologies, Inc., Seattle, WA (US)

( * ) Notice: Subject to any disclaimer, the term of this patent is extended or adjusted under 35 U.S.C. 154(b) by 441 days.

(21) Appl. No.: 17/348,029

(22) Filed: Jun. 15, 2021

(51) Int. Cl.
*G06V 20/40* (2022.01)
*G06F 18/241* (2023.01)
*G06K 7/14* (2006.01)
*G06V 30/14* (2022.01)
*G06V 30/19* (2022.01)

(52) U.S. Cl.
CPC ............ *G06V 20/40* (2022.01); *G06F 18/241* (2023.01); *G06K 7/1413* (2013.01); *G06V 30/14* (2022.01); *G06V 30/19* (2022.01)

(58) Field of Classification Search
CPC ........ G06V 20/40; G06V 30/14; G06V 30/19; G06F 18/241; G06K 7/1413
See application file for complete search history.

(56) References Cited

U.S. PATENT DOCUMENTS

| | | | |
|---|---|---|---|
| 10,963,659 B1* | 3/2021 | Ahmed | G06K 7/1413 |
| 11,281,713 B1* | 3/2022 | Angel | G06V 10/809 |
| 11,481,751 B1* | 10/2022 | Chaubard | G06V 10/82 |
| 2019/0318417 A1* | 10/2019 | Gumaru | G06Q 30/0635 |
| 2024/0127446 A1* | 4/2024 | Bagherinia | G06T 7/248 |

* cited by examiner

*Primary Examiner* — Matthew C Bella
*Assistant Examiner* — Janice E. Vaz
(74) *Attorney, Agent, or Firm* — Lee & Hayes, P.C.

(57) ABSTRACT

This disclosure describes, in part, techniques for collecting image data representing item identifiers, such as barcodes. For instance, system(s) may receive image data representing images, where the images depict at least a portion of an identifier located on an item. The system(s) may then identify a first portion of the image data representing an image that that is associated a low confidence level. Next, the system(s) may identify a second portion of the image data representing additional images that are associated high confidence levels. Using results for this the second portion of the image data, the system(s) may determine a ground truth result for the first portion of the image data. The system(s) may then store, in one or more databases, data representing the ground truth result in association with the first portion of the image data.

20 Claims, 10 Drawing Sheets

TECHNIQUES FOR STORING IMAGES DEPICTING IDENTIFIERS

BACKGROUND

A materials handling facility, such as a warehouse or a retail store, often provides a user with a tote (e.g., carts, baskets, etc.) to facilitate the processes by which the user locates, identifies, retrieves, and transports items at the facility. Traditionally, when the user has finished identifying and retrieving the items he or she desires, the user may transport the items in the tote to a check-out destination within the facility, such as a distribution station, a cashier, or a dedicated self-checkout stand. A device, such as a register, may then scan barcodes located on the items in order to identify the items retrieved by the user. The device may then generate a list that identifies each of the items.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
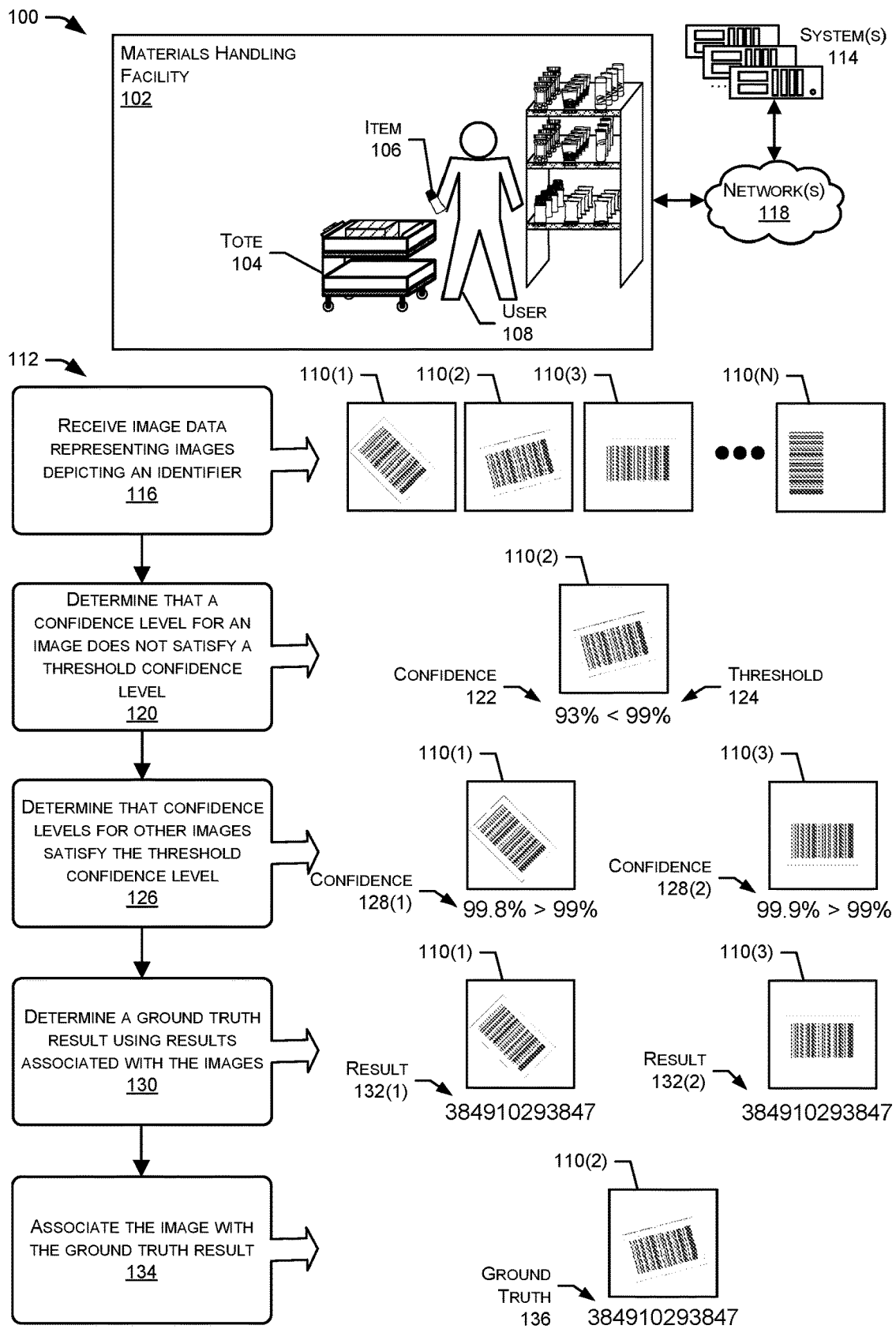
FIG. 1 illustrates an example of determining a ground truth result for image data representing an identifier of an item, in accordance with examples of the present disclosure.

This disclosure is directed to, at least in part, techniques for collecting image data representing item identifiers, such as barcodes, which may, in some examples, be used to train classifier(s). For instance, system(s) may receive first image data representing first images, where the first images depict at least a portion of an identifier (e.g., a barcode, a QR code, a label, a graphic, etc.) located on an item. The system(s) may also receive additional data representing results for the identifier as determined by the classifier(s) using the first image data, confidence levels for the results, indications of frames in video(s) that correspond to the images, identifier(s) for camera(s) that generated the video(s), and/or any other information. Using the additional data, the system(s) may identify a first portion of the first image data (referred to, in these examples, as "second image data") representing a second image, from the first images, that is associated a low confidence level. The system(s) may then identify a second portion of the first image data (referred to, in these examples, as "third image data") representing third images, from the first images, that are associated high confidence levels. Using the results for this third image data, as represented by the additional data, the system(s) may determine a ground truth result for the second image data. The system(s) may then store, in one or more databases, data representing the ground truth result in association with the second image data. In some examples, the system(s) may then use the second image data representing the second image, as well as data representing the ground truth result, in order to train the classifier(s).

For more detail, during a shopping session, a user may place items into a tote, such as a basket, a cart, or other receptacle. The tote may include one or more cameras coupled to the tote that generate video data representing video(s), where the video(s) depict the items that the user places into the tote and/or removes from the tote. The tote may also include one or more components (e.g., software component(s), hardware processor(s), etc.) that analyze the video data in order to determine item identifiers, such as barcodes, for the items placed into the tote and/or removed from the tote. The one or more components may then update a virtual item listing for the user of the tote. Once the user has finished their shopping session, the user may be able to efficiently check-out of the facility without having to scan or otherwise register their items with a cashier or at a designated self-checkout stand. In some examples, the user may simply depart the facility with their items and entirely avoid a traditional checkout experience of a facility, such as a grocery store.

To identify the identifier, the tote may utilize a localization component that applies a first trained classifier to the video data in order to identify a region of the video data that represents the identifier of the item. That is, the first classifier may be trained to identify which portion(s) of the video data represent some or all of the identifier or other predefined identifying information printed on the item. After identifying the region of the video data that represents the identifier, the localization component may provide an indication of the region to a reader component. For example, the localization component may provide coordinates of the bounding box, the video data corresponding to the region itself, and/or other information to the reader component. The reader component may then apply one or more second trained classifiers to the region of the video data in order to identify (i.e., read) the identifier. For example, such as when the identifier includes a barcode, the barcode printed on the item may correspond to an alphanumeric string of characters, such as a string of six or twelve numeric digits. Thus, the one or more second classifiers may attempt to identify each character represented by the barcode.

The tote may also be configured to generate the first image data representing the first images of the identifier. For example, for a frame of a video represented by the video data, the tote may generate a first image that depicts at least the region of the frame depicting the identifier. In some examples, the tote generates the first image data to represent a threshold number of first images for the session, such as one hundred first images, five hundred first images, one thousand first images, and/or the any other number of first images. The tote may also generate the additional data associated with the first image data. For example, for a given first image, the additional data may represent a result for the identifier (e.g., a string of characters for the barcode) as determined by the reader component using an first image, a confidence level associated with the result, an indication of the frame that was used to generate the first image, an identifier of the camera that generated the video data, and/or any other information associated with the first image. The tote may then send the video data, the first image data, and the additional data to the system(s).

In some examples, the system(s) may initially filter the first image data by removing first image(s) that may be unreadable by readers. For example, based on the filtering, the system(s) may remove first image(s) that depict an occlusion blocking a portion of the identifier, depict only a portion of the identifier (e.g., only a portion of the bars or the digits of a barcode), include an image quality that does not satisfy a threshold quality (e.g., depict a glare over the barcode, depict a blurry identifier, etc.), and/or depict an identifier that that does not satisfy a threshold size (e.g., the identifier was a far distance from the camera). In some examples, the system(s) may further filter the first images using a contrast-to-noise ratio (CNR) for the first images. In such examples, the CNR may be computed by dividing the image contrast by a standard deviation, where the image contrast may be computed using a Haralick feature. Next, the system(s) may remove first image(s) that include SNR(s) that do not satisfy a threshold, such as one. However, in other examples, the system(s) may use a threshold other than one.

The system(s) may then analyze the additional data in order to identify the second image data that is associated with a low confidence level, where the second image data represents the second image. In some examples, the system(s) identify the second image data that is associated with the low confidence level based on the confidence level not satisfying (e.g., being less than) a threshold confidence level (e.g., 90%, 95%, 99%, etc.). For example, the system(s) may analyze the additional data and, based on the analysis, determine that the second image data is associated with a confidence level of 80%. The system(s) may then compare the confidence level to the threshold confidence level, which may be 99% in this example. Based on the comparison, the system(s) may determine that the confidence level of 80% is less than the threshold confidence level of 99%. As such, the system(s) may determine that the second image data is associated with a low confidence level. Because of this, the system(s) may determine to store the second image data representing the second image in one or more databases.

Additionally, since the second image data is associated with a low confidence level, and thus the result associated with the second image data may not be trusted, the system(s) may attempt to determine a ground truth result for the second image data. To determine the ground truth result, the system(s) may determine that the second image is associated with a frame (referred to, in these examples, as a "first frame") represented by the video data. The system(s) may then identify the third images that are associated with frames (referred to, in these examples, as "second frames"), represented by the video data, which were generated proximate to (e.g., before and/or after) the first frame and which are associated with high confidence levels. In other words, the system(s) may identify the third image data that likely represents the same identifier as the second image data, and which is associated with results that may be trusted by the system(s). In some examples, the system(s) determine that the third image data is associated with the high confidence levels based on the confidence levels satisfying (e.g., being equal to or greater than) the threshold confidence level.

For example, and using the example above, the system(s) may analyze the additional data and, based on the analysis, determine that third image data, representing a third image, is associated with a confidence level of 99.5%. The system(s) may then compare the confidence level to the threshold confidence level, which may again be 99% in this example. Based on the comparison, the system(s) may determine that the confidence level of 99.5% is equal to or greater than the threshold confidence level of 99%. As such, the system(s) may determine that the third image data is associated with a high confidence level. The systems may then perform similar processes in order to identify additional third image data that is also associated with high confidence level(s).

Since this third image data is associated with high confidence levels, the system(s) may determine that the results associated with the third image data may be trusted. As such, the system(s) may use the results to determine the ground truth result for the second image data. In some examples, to determine the ground truth result using these results, the system(s) may generate a list associated with the results, where the list indicates the number of the third images that are associated with each result. For example, and if the results include strings of characters associated with a barcode, the list may indicate that a first string of characters (e.g., 475829384756) was determined using a first number of the third images (e.g., 15 images), a second string of characters (e.g., 475829388756) was determined using second number of the third images (e.g., 6 images), and a third string of characters (e.g., 475829384999) was determine using a third number of the third images (e.g., 1 image). The system(s) may then use this list in order to determine the ground truth result for the second image data.

For instance, and in some examples, the system(s) may initially remove any results that are associated with a number of images that is less than a threshold number of images. The threshold number of images may include, but is not limited to, one image, two images, five images, and/or any other number of images. For example, and using the example above, the system(s) may remove the third string of characters from the list since the third string of characters is associated with only one image. In some examples, the system(s) may then determine that the ground truth result includes the result that is associated with the greatest number of images. For example, and again using the example above, the system(s) may determine that the ground truth result corresponds to the first string of characters. However, in other examples, the system(s) may perform one or more additional verification processes before determining that the ground truth result includes the result that is associated with the greatest number of images.

For a first example, such as when the result includes a string of characters, the system(s) may verify the string of characters by determining that the string of characters includes the correct number of digits (e.g., 8 digits, 10 digits, 12 digits, etc.) for barcodes. For a second example, the system(s) may verify the result by determining that the result is associated with an item that is provided at the facility. For instance, and again when the result includes the string of characters, the system(s) may determine that the string of characters matches an actual barcode of an actual item at the facility. In another example, the system(s) may use the "check digit" of the string of characters to ensure that the string of characters corresponds to a valid barcode. While these are just a couple example techniques of how the system(s) may verify a result, in other example, the system(s) may perform additional and/or alternative verification techniques.

If the system(s) determine that the result that is associated with the greatest number of images is valid, then the system(s) may determine that the ground truth result includes that result. For example, and using the example above, if the system(s) determine that the first string of characters is valid for a barcode, then the system(s) may determine that the ground truth result includes the first string of characters. However, if the system(s) determine that the result associated with the greatest number of images is not valid, then the system(s) may perform one or more additional processes. For a first example, the system(s) may determine that the ground truth result for the second image data cannot be determined and as such, the system(s) may remove the second image data from the one or more databases. For a second example, the system(s) may select the result that is associated with the second greatest number of images and determine whether that result is valid, using one or more of the processes above. If the system(s) then determine that result is valid, then the system(s) may determine that the ground truth result corresponds to that result. However, if the system(s) determine that result is not valid, then the system(s) may continue down the list of results until the system identifier a valid result.

After determining the ground truth result, the system(s) may store, in the one or more databases, data representing the ground truth result for the second image data. Additionally, in some examples, the system(s) may continue to perform these processes above in order to store second image data representing additional second images along with data representing the ground truth results for the second image data. In some examples, the system(s) continue these processes until storing second image data representing a threshold number of images, such as one hundred images, one thousand images, one million images, and/or any other number of images. The system(s) may then use the second image data representing these second images, along with the data representing the ground truth results, to train the component(s) described above.

For example, the system(s) may input both the second image data representing the second images along with the data representing the ground truth results into the classifier(s) (e.g., the second classifier(s)), described above, in order to train the classifier(s). After training the classifier(s), the system(s) may then evaluate the updated classifier(s) in order to determine whether the accuracy of the updated classifier(s) was improved by the training. For example, the system(s) may analyze, using the updated classifier(s), additional image data representing images depicting identifiers. The system(s) may then analyze the results output by the updated classifiers and, based on the analysis, determine a percentage of the results that are correct. If the percentage of the results is greater than a previous percentage of results for the classifier(s) that was determined prior to the training, then the system(s) may determine that the accuracy of the updated classifier(s) has improved. As such, the system(s) may send the updated classifier(s) to the tote (as well as other totes associated with the facility) so that the tote may use the updated classifier(s) for identifying items. For instance, the system(s) may send the updated classifier(s) to the totes on a periodic basis (e.g., nightly, weekly, etc.) or in response to any other triggering event.

While the examples above describe storing image data representing identifiers that include barcodes and then using that image data to train classifier(s) that are configured to read the barcodes, in other examples, similar processes may be performed for other types of identifiers. For a first example, the tote may use classifier(s) that are configured to identify labels, such as names of products, located on items. In such an example, the system(s) may perform the processes above in order to both identify image data representing the labels and determine ground truth results associated with the image data. The system(s) may then use the image data, along with data representing the ground truth results, to train the classifier(s). For a second example, the tote may use classifier(s) that are configured to identify graphics, such as trademarks, located on items. In such an example, the system(s) may perform the processes above in order to both identify image data representing the graphics and determine ground truth results associated with the image data. The system(s) may then use the image data, along with data representing the ground truth results, to train the classifier(s).

Although the techniques described herein are with reference to a session of a user in a materials handling facility, the techniques are generally applicable to any item-recognition environment. Other examples may include inventory-management systems automating the intake of new shipments of item inventory, libraries for processing returned books and/or identifying books obtained by a user during a library session, video-rental facilities for processing and sorting returned movies, and so forth.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example of determining a ground truth result for image data representing an identifier of an item, in accordance with examples of the present disclosure. As shown, an example environment 100 of a materials handling facility 102 includes an item-identifying tote 104 to identify at least an item 106 placed into the tote 104 by a user 108. The tote 104 uses one or more trained classifiers, operating on video data generated by one or more cameras associated with the tote 104, to determine an identifier associated with the item 106. Additionally, in some examples, the tote uses the trained classifier(s) to update a virtual item listing (or "virtual cart") using the identifier. In the example of FIG. 1, the identifier includes a barcode. However, in other examples, the identifier may include any other type of identifier described herein.

To identify the identifier, the tote 104 may utilize a localization component that applies a first trained classifier to the video data in order to identify a region of the video data that represents the identifier of the item 106. That is, the first classifier may be trained to identify which portion(s) of the video data represent some or all of the identifier or other predefined identifying information printed on the item 106. After identifying the region of the video data that represents the identifier, the localization component may provide an indication of the region to a reader component. For example, the localization component may provide coordinates of the bounding box, the video data corresponding to the region itself, and/or other information to the reader component. The reader component may then apply one or more second trained classifiers to the region of the video data in order to identify (i.e., read) the identifier. For example, such as when the identifier includes a barcode, the barcode printed on the item 106 may correspond to an alphanumeric string of characters, such as a string of six or twelve numeric digits. Thus, the one or more second classifiers may attempt to identify each character represented by the barcode.

The tote 104 may also be configured to generate image data representing images 110(1)-(N) (also referred to singularly as an "image 110" or plurally as "images 110") of the identifier. For example, and for a frame represented by the video data, the tote 104 may generate an image 110 that depicts at least the region of the frame depicting the identifier. In some examples, the tote 104 generates the image data to represent a threshold number of images 110 for the session, such as one hundred images 110, five hundred images 110, one thousand images 110, and/or the any other number of images 110. The tote 104 may also generate additional data associated with the images 110. For example, and for a given image 110, the additional data may represent a result for the identifier (e.g., a string of characters for the barcode) as determined by the reader component using a frame, a confidence level associated with the result, an indication of the frame that was used to generate the image 110, an identifier of the camera that generated the video data, and/or any other information associated with the image 110.

FIG. 1 also illustrates a process 112 that system(s) 114 may perform to collect image data representing the identifier as well as determining a ground truth result associated with the image data. To begin, at operation 116, the process 112 may include receiving, over network(s) 118, image data representing images depicting an identifier. For instance, the system(s) 114 may receive the image data from the tote 104. As discussed above, the image data may represent the images 110 depicting the identifier, where the identifier includes a barcode in the example process 112 of FIG. 1. However, in other examples, the identifier may include any other type of identifier (e.g., a QR code, a label, a graphic, etc.). Additionally, in some examples, the system(s) 114 may receive, over the network(s) 118, the video data and/or the additional data from the tote 104. The system(s) 114 may then store the video data, the image data, and/or the additional data in one or more databases.

At operation 120, the process 112 may include determining that a confidence level for an image does not satisfy a threshold confidence level. For instance, the system(s) 114 may analyze the additional data in order to determine a confidence level 122 for the second image 110(2). The system(s) 114 may then compare the confidence level 122 to a threshold confidence level 124 and, based on the comparison, determine that the confidence level 122 is less than the threshold confidence level 124. Based on the determination, the system(s) 114 may determine that a result associated with the second image 110(2), as determined by the reader and as represented by the additional data, is unreliable and/or may not be trusted. As such, the system(s) 114 may determine to store the image data representing the second image 110(2) in one or more databases. Additionally, the system(s) 114 may attempt to determine a ground truth result for the image data representing the second image 110(2).

For example, at operation 126, the process 112 may include determining that confidence levels for other images satisfy the threshold confidence level. For instance, the system(s) 114 may initially identify images 110 to use in order to determine the ground truth result for the second image 110(2). In some examples, to identify the images 110, the system(s) 114 may analyze the additional data in order to determine that the second image 110(2) is associated with a frame of the video represented by the video data. The system(s) 114 may then identify images 110 that are associated with frames that were captured before and/or after the identified frame. In other words, the system(s) 114 may attempt to identify the images 110 that likely depict the same identifier as the second image 110(2).

Figure 3:
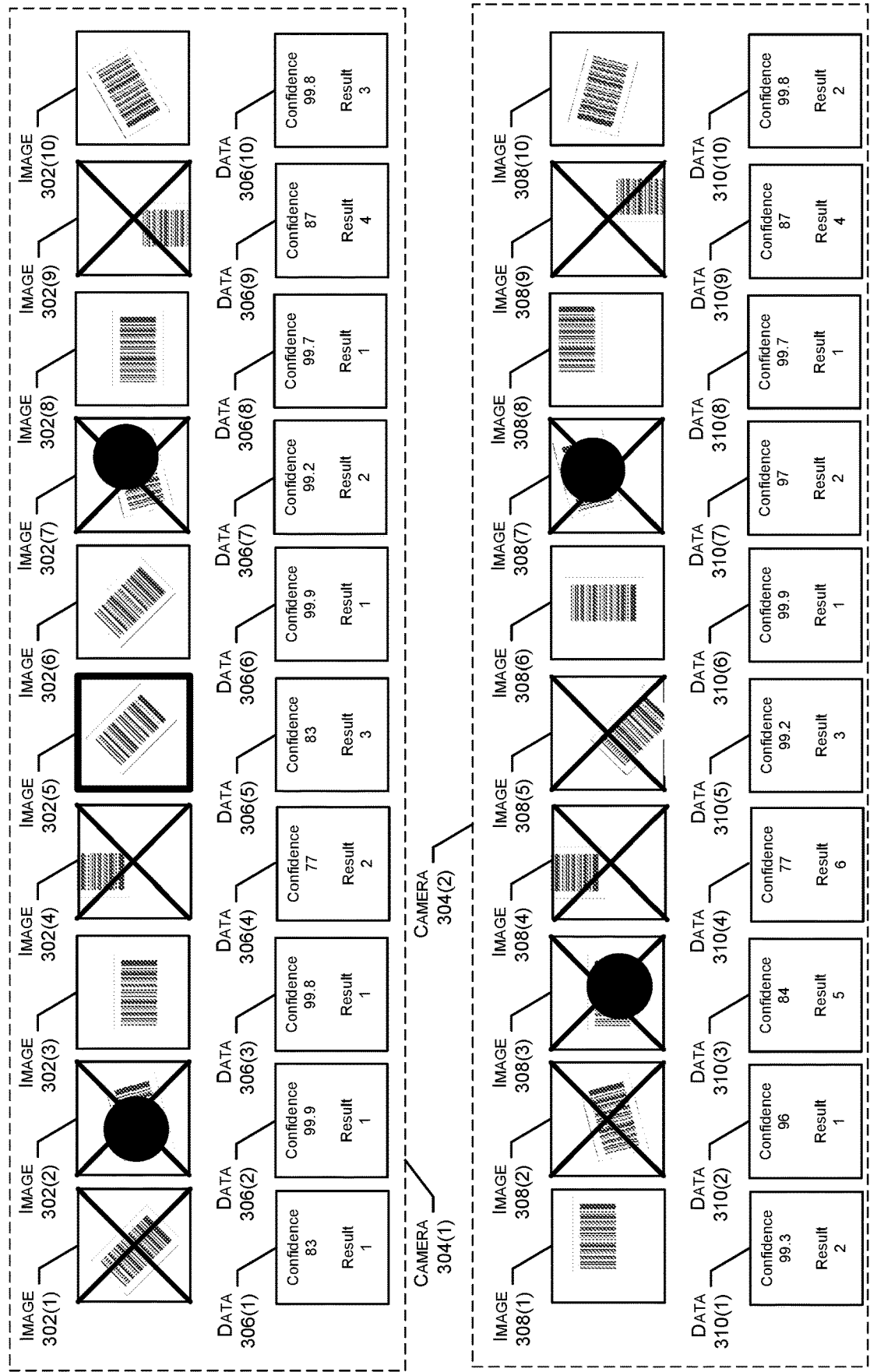
FIG. 3 illustrates an example of identifying image data that is then used to determine a ground truth result for additional image data, in accordance with examples of the present disclosure.

In some examples, the system(s) 114 identify a threshold number of the images 110. For example, and as illustrated in the example of FIG. 3, the system(s) 114 may identify a first number of images 110 that are associated with a first number of frames that are before the frame and a second number of images 110 that are associated with a second number of frames that are after the frame. The first number of images 110 and/or the second number of images 110 may include, but are not limited to, five images, ten images, fifty images, one hundred images, and/or any other number of images. In some examples, the system(s) 114 identify the images 110 that are associated with the same video as the second image 110(2) (e.g., all of the images 110 were created using a video generated by a single camera). However, in other examples, the system(s) 114 may identify the images 110 that are associated with multiple videos. For example, if the tote 104 includes four cameras, where each camera generated video data representing a respective video, then the system(s) 114 may identify images 110 associated with frames from each of the videos.

The system(s) 114 may also identify images 110 that include confidence levels 128(1)-(2) (also referred to singularly as a "confidence level 128" or plurally as "confidence levels 128") that satisfy the threshold confidence level 124. For instance, and as illustrated in the example of FIG. 1, the first image 110(1), which is associated with a frame that was captured before the frame associated with the second image 110(2), includes a confidence level 128(1) that is equal to or greater than the threshold confidence level 124. Additionally, the third image 110(3), which is associated with a frame that was captured after the frame associated with the second image 110(2), includes a confidence level 128(2) that is also equal to or greater than the threshold confidence level 124. Because of this, the system(s) 114 may determine that results associated with the first image 110(1) and the third image 110(3), as determined by the reader and as represented by the additional data, are reliable and/or may be trusted. Because of this, the system(s) 114 may determine to use the results associated with the first image 110(1) and the third image 110(3) in order to determine the ground truth result for the second image 110(2).

For example, at operation 130, the process 112 may include determining a ground truth result using the results associated with the images. For instance, the system(s) 114 may analyze the additional data in order to determine a result 132(1) that the reader determined for the first image 110(1) and a result 132(2) that the reader determined for the third image 110(3). In the example of FIG. 1, the result 132(1) is the same as the result 132(2). However, in other examples, the result 132(1) may be different than the result 132(2). The system(s) 114 may then use the results 132(1)-(2) to determine the ground truth result for the second image 110(2).

For example, the system(s) 114 may generate a list associated with the results 132(1)-(2), where the list indicates the number of images 110 that are associated with each result 132(1)-(2). For example, and in the example of FIG. 1, the list may indicate that the result 132(1)-(2) "384910293847" is associated with two images 110. However, while the example of FIG. 1 only includes two results 132(1)-(2), in other examples, the list may include any number of results associated with any number of images 110. The system(s) 114 may then use the list to determine the ground truth result for the second image 110(2). For example, the system(s) 114 may then determine that the ground truth result 132(1)-(2) includes the result that is associated with the greatest number of images 110. In the example of FIG. 1, this would include the result 132(1)-(2) "384910293847". Additionally, in some examples, the system(s) 114 may perform one or more additional verification processes, as described herein, before determining that the ground truth result includes the result 132(1)-(2) that is associated with the greatest number of images.

At operation 134, the process 112 may include associating the image with the ground truth result. For instance, the system(s) 114 may associate a ground truth result 136 with the second image 110(2). In some examples, the system(s) 114 perform the association by storing, in the one or more databases, data representing the ground truth result 136 along with the image data that represents the second image 110(2). In some examples, the system(s) 114 may continue to perform the process 112 of FIG. 1 in order to identify additional images 110 as well as determine additional ground truth results for the additional images 110. The system(s) 114 may then use the image data representing the images 110, along with the data representing the ground truth results, to train the classifier(s) associated with the reader. Additionally, the system(s) 114 may send, over the network(s) 118, the classifier(s) to the tote 104.

In some examples, the system(s) 114 may be located within the facility 102. In some examples, the system(s) 114 may be located within the tote 104. Still, in some examples, the system(s) 114 may be located outside of the facility 102. For example, the system(s) 114 may include a cloud-based system that receives data from totes located at multiple facilities.

Figure 2A:
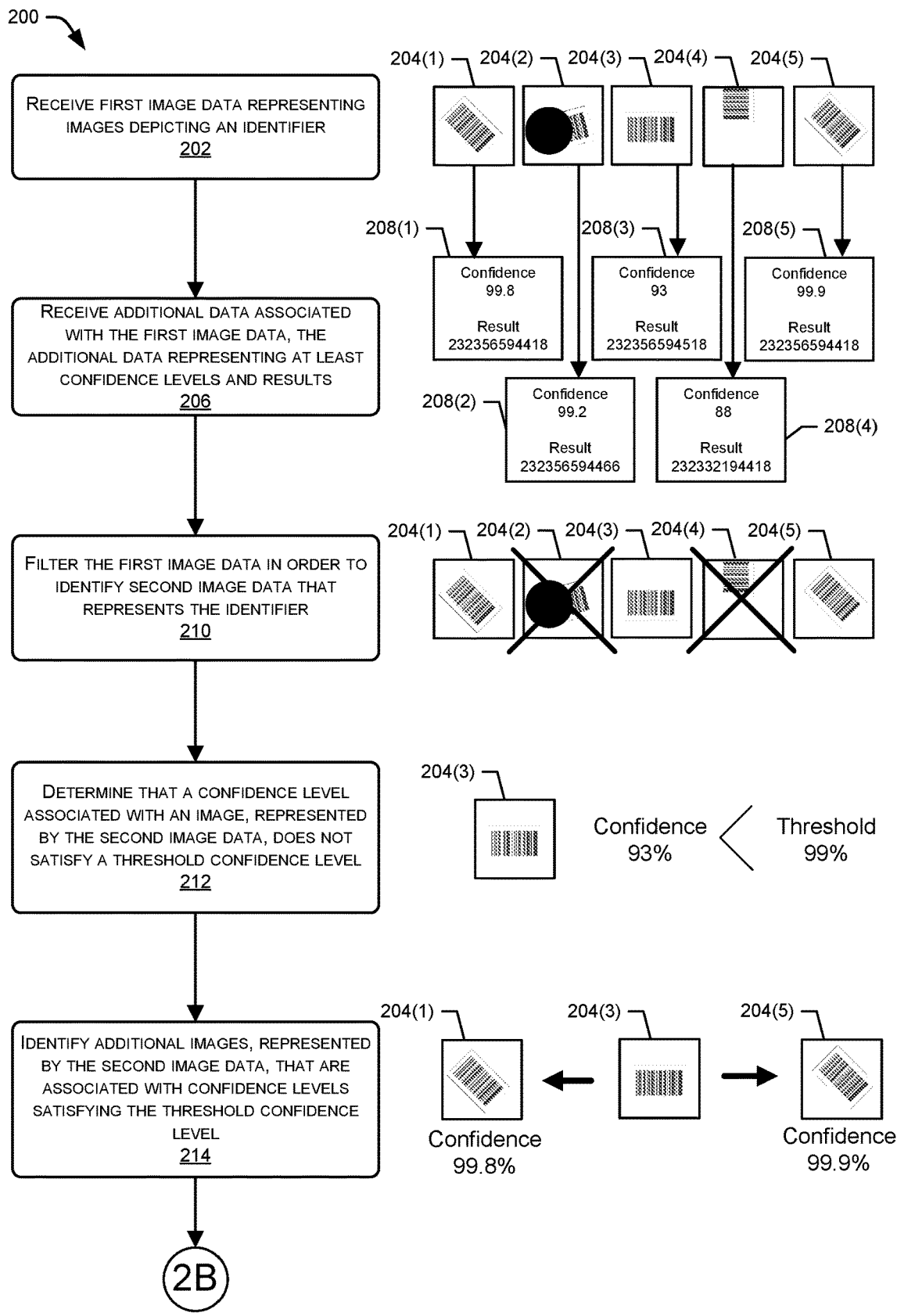
FIGS. 2A-2C illustrate a flow diagram of an example process for storing image data representing identifiers along with ground truth results for the image data, in accordance with examples of the present disclosure.
Figure 2B:
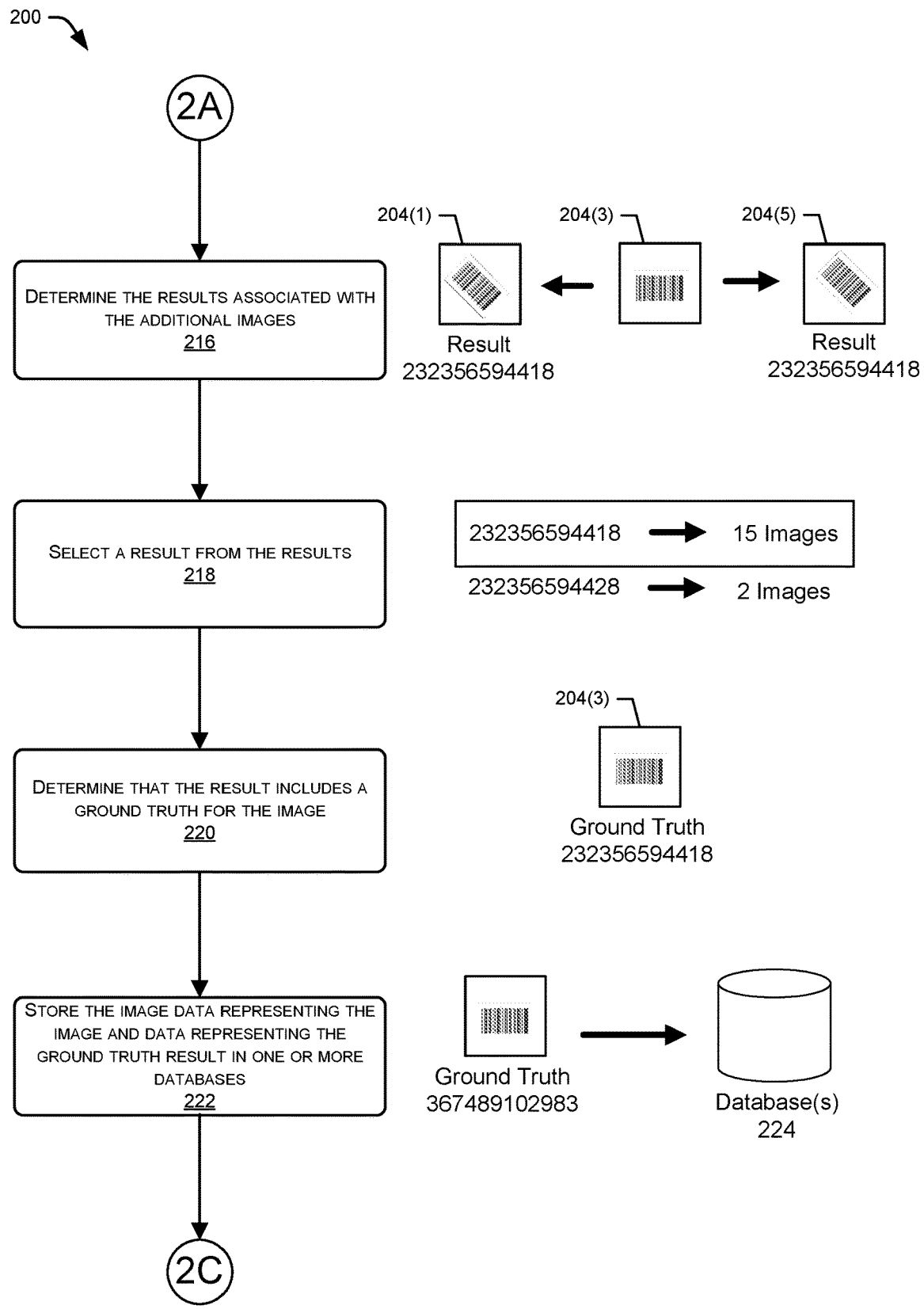
Figure 2C:
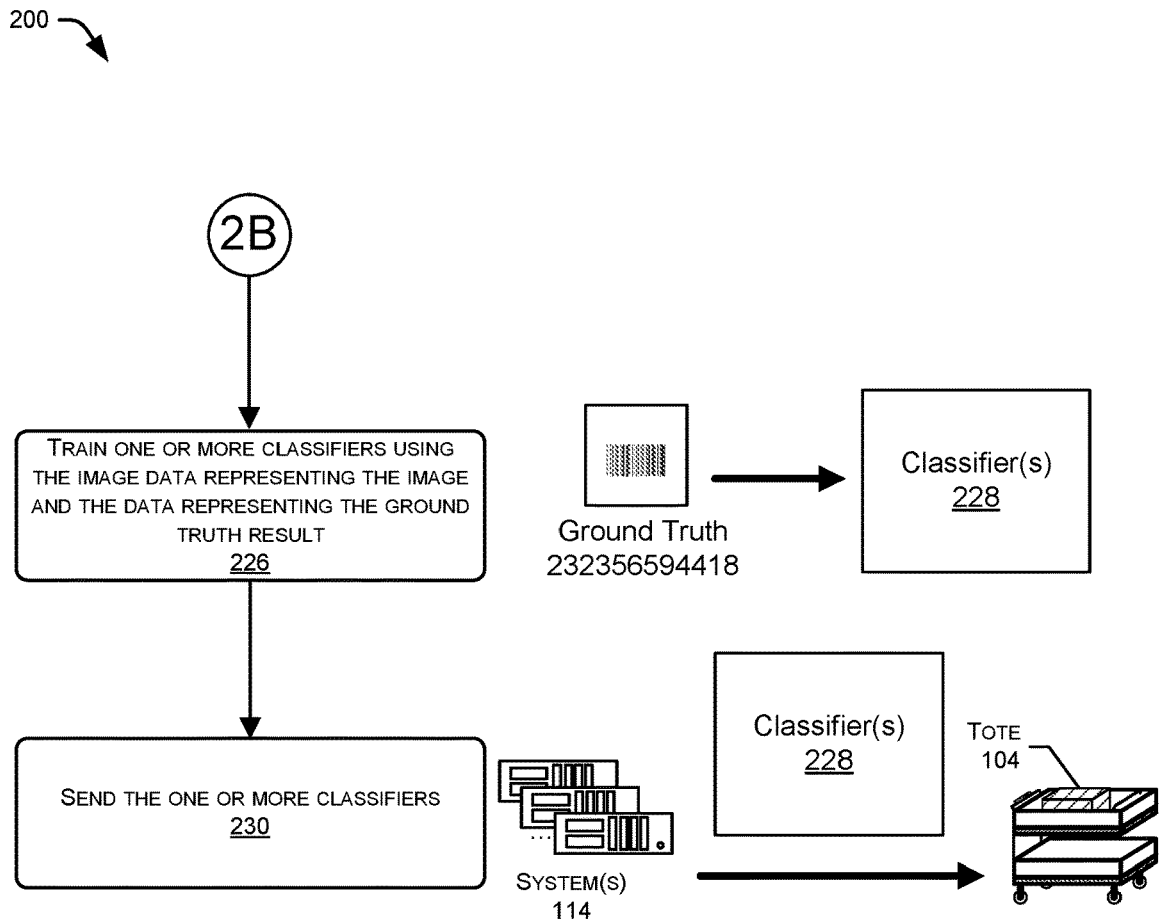

FIGS. 2A-2C illustrate a flow diagram of an example process 200 for storing image data representing identifiers along with ground truth results for the image data, in accordance with examples of the present disclosure. At operation 202, the process 200 may include receiving first image data representing images depicting an identifier. For instance, the system(s) 114 may receive the first image data from the tote 104. As described herein, the tote 104 may generate the first image data to represent the images 204 (1)-(5) (also referred to singularly as an "image 204" or plurally as "images 204"), where the tote 104 generates the first image data using video data generated by one or more cameras associated with the tote 104. In some examples, the system(s) 114 receive the first image data representing a threshold number of the images 204 from the tote 104 that were generated during a shopping session for the user 108.

At 206, the process 200 may include receiving additional data associated with the first image data, the additional data representing at least confidence levels and results. For instance, the system(s) 114 may receive additional data 208(1)-(5) (also referred to as "additional data 208") from the tote 104. As shown, the additional data 208 is associated with the first image data representing the images 204. For example, the first additional data 208(1) is associated with the first image 204(1), the second additional data 208(2) is associated with the second image 204(2), the third additional data 208(3) is associated with the third image 204(3), the fourth additional data 208(4) is associated with the fourth image 204(4), and the fifth additional data 208(5) is associated with the fifth image 204(5). As shown, the additional data 208 represents the confidence levels and the results for each image 204. However, in other examples, the additional data 208 may further represent an identifier of the camera that generated the video, an identifier of the frame from the video that was used to generate the image 204, and/or other information associated with the images 204.

At operation 210, the process 200 may include filtering the first image data in order to identify second image data that represents the identifier. For instance, the system(s) 114 may filter the images 204 by removing image(s) 204 that depict an occlusion blocking a portion of the identifier, depict only a portion of the identifier (e.g., only a portion of the bars or the digits of a barcode), include an image quality that does not satisfy a threshold quality (e.g., depict a glare over the barcode, depict a blurry identifier, etc.), and/or depict an identifier that that does not satisfy a threshold size (e.g., the identifier was a far distance from the camera). For example, and in the example of FIGS. 2A-2C, the system(s) 114 may remove the first image data representing the second image 204(2) since the second image 204(2) depicts an occlusion blocking part of the identifier. Additionally, the system(s) 114 may remove the first image data representing the fourth image 204(4) since the fourth image 204(4) only depict a portion of the identifier.

At operation 212, the process 200 may include determining that a confidence level associated with an image, represented by the second image data, does not satisfy a threshold confidence level. For instance, the system(s) 114 may analyze the third additional data 208(3) in order to determine the third confidence level associated with the third image 204(3), where the third confidence level is 93% in the example of FIGS. 2A-2C. The system(s) 114 may then compare the third confidence level to a threshold confidence level and, based on the comparison, determine that the third confidence level is less than the threshold confidence level. Based on the determination, the system(s) 114 may determine that a result associated with the third image 204(3), as determined by the reader and as represented by the third additional data 208(3), is unreliable and/or may not be trusted.

At operation 214, the process 200 may include identifying additional images, represented by the second image data, that are associated with confidence levels that satisfy the threshold confidence level. For instance, the system(s) 114 may initially identify images 204 to use in order to determine the ground truth result for the third image 204(3). In some examples, to identify the images 204, the system(s) 114 may analyze the additional data 208 in order to identify at least the first image 204(1) that was generated using a frame that is before the frame associated with the third image 204(3) and the fifth image 204(5) that was generated using a frame that is after the frame associated with the third image 204(3). By identifying images 204 associated with frames that were generated before and after the frame associated with the third image 204(3), the system(s) 114 may determine that the images 204 depict the same identifier as the third image 204(3).

The system(s) 114 may then analyze the first additional data 208(1) in order to determine the first confidence level associated with the first image 204(1), where the first confidence level is 99.8% in the example of FIGS. 2A-2C. The system(s) 114 may then compare the first confidence level to the threshold confidence level and, based on the comparison, determine that the first confidence level is equal to or greater than the threshold confidence level. Additionally, the system(s) 114 may analyze the fifth additional data 208(5) in order to determine the fifth confidence level associated with the fifth image 204(5), where the fifth confidence level is 99.9% in the example of FIGS. 2A-2C. The system(s) 114 may then compare the fifth confidence level to the threshold confidence level and, based on the comparison, determine that the fifth confidence level is equal to or greater than the threshold confidence level.

At operation 216, the process 200 may include determining the results associated with the additional images. For instance, the system(s) 114 may analyze the first additional data 208(1) and, based on the analysis, determine the first result associated with the first image 204(1). Additionally, the system(s) 114 may analyze the fifth additional data 208(5) and, based on the analysis, determine the fifth result associated with the fifth image 204(5). In the example of FIGS. 2A-2C, the first result and the fifth result both include the string of characters "23235659448" since the identifier includes a barcode. However, in other examples, the results may include other types of results (e.g., letters and numbers associated with labels, identifiers of graphics, etc.). Additionally, while the example of FIGS. 2A-2C illustrates the first result being the same as the fifth result, in other examples, the first result may be different than the fifth result.

Furthermore, in some examples, the system(s) 114 may perform one or more additional and/or alternative verification tests for the first result and/or the fifth result. For example, such as when the identifier includes a barcode, the system(s) 114 may determine a hamming distance between the first result (e.g., a first string of characters) and the third result (e.g., a second string of characters). The system(s) 114 may then determine whether the hamming distance within a threshold. In some examples, the threshold may include, but is not limited to, two, three, five, seven, and/or any other distance threshold. If the system(s) 114 determine that the hamming distance is within the threshold, then the system(s) 114 may continue to use the first result. However, if the system(s) 114 determine that the hamming distance is outside of the threshold, then the system(s) 114 may determine not to use the first result. The system(s) 114 may then perform similar processes for each of the other results (e.g., the fifth result in the example of FIGS. 2A-2C).

At operation 218, the process 200 may include selecting a result from the results. For instance, the system(s) 114 may select the result from the results for the images 204. In some examples, to select the result, the system(s) 114 may generate a list associated with the results, where the list indicates the number of images 204 that are associated with each result. For example, and in the example of FIGS. 2A-2C, the list may indicate that the result "232356594418" is associated with fifteen images 204 and the result "232356594428" is associated with two images 204. The system(s) 114 may then use the list to select the result. In the example of FIGS. 2A-2C, the system(s) 114 select the result that is associated with the greatest number of images 204, which includes "232356594418". Additionally, in some examples, the system(s) 114 may perform one or more additional verification processes, as described herein, before selecting the result.

For a first example, such as when the result includes a string of characters, the system(s) 114 may verify the string of characters by determining that the string of characters includes the correct number of digits (e.g., 8 digits, 10 digits, 12 digits, etc.) for barcodes. For a second example, the system(s) 114 may verify the result by determining that the result is associated with an item that is provided at the facility. For instance, and again when the result includes the string of characters, the system(s) 114 may determine that the string of characters matches an actual barcode of an actual item at the facility. While these are just a couple example techniques of how the system(s) 114 may verify a result, in other example, the system(s) 114 may perform additional and/or alternative verification techniques.

At operation 220, the process 200 may include determining that the result includes a ground truth result for the image and at 222, the process 200 may include storing the image data representing the image and data representing the ground truth result in one or more databases. For instance, the system(s) 114 may determine that the result includes the ground truth result for the third image 204(3). The system(s) 114 may then store the image data representing the third image 204(3) and data representing the ground truth result in one or more databases 224. Additionally, in some examples, the system(s) 114 may perform similar processes in order to store image data representing additional images 204 as well as data representing the ground truth results for the additional images in the database(s) 224.

At operation 226, the process 200 may include training one or more classifiers using the image data representing the image and the data representing the ground truth result. For instance, the system(s) 114 may train classifier(s) 228 by inputting both the image data representing the third image 204(3) and the data representing the ground truth result into the classifier(s) 228. In some examples, the server(s) 114 may further train the classifier(s) 228 by inputting the image data representing additional images 204 and the data representing the ground truth results for the additional images 204 into the classifier(s) 228. Additionally, in some examples, the system(s) 114 may analyze results from the updated classifier(s) 228 to determine whether an accuracy associated with the updated classifier(s) 228 has improved from the training.

At operation 230, the process 200 may include sending the one or more classifiers. For instance, the system(s) 114 may send the updated classifier(s) 228 to at least the tote 104 so that the tote may use the updated classifier(s) 228 to analyze additional video data and/or image data. In some examples, the system(s) 114 may send the updated classifier(s) 228 after training the classifier(s) 228, after determining that the accuracy of the classifier(s) 230 has improved, periodically (e.g., each hour, day, week, month, etc.), and/or the like. Additionally, the system(s) 114 may continue to repeat the example process 200 in order to continue to train the classifier(s) 228 as the system(s) 114 continue to receive data from the tote 104.

FIG. 3 illustrates an example of identifying image data that is then used to determine a ground truth result for other image data, in accordance with examples of the present disclosure. As shown, the system(s) 114 may receive first image data representing images 302(1)-(10) (also referred to singularly as an "image 302" or plurally as "images 302") generated by the tote 104 using first video data generated by a first camera 304(1). The system(s) 114 may also receive additional data 306(1)-(10) (also referred to as "additional data 306") associated with the images 302. Additionally, the system(s) 114 may receive second image data representing images 308(1)-(10) (also referred to singularly as an "image 308" or plurally as "images 308") generated by the tote 104 using second video data generated by a second camera 304(2). The system(s) 114 may also receive additional data 310(1)-(10) (also referred to as "additional data 310") associated with the images 308.

In the example of FIG. 3, the system(s) 114 may use the fifth additional data 306(5) to determine that the fifth image 302(5) is associated with a confidence level (e.g., 83%) that is less than a threshold confidence level. As such, the system(s) 114 may select the fifth image 302(5), which is illustrated by the bold border around the fifth image 302(5). The system(s) 114 may then analyze each of the other images 302 as well as the images 308 in order to identify images 302, 308 for determining the ground truth result for the fifth image 302(5). To identify the images 302, 308, the system(s) 114 may filter the images 302, 308 by removing images 302, 308 that depict an occlusion blocking a portion of the identifier, depict only a portion of the identifier (e.g., only a portion of the bars or the digits of a barcode), include an image quality that does not satisfy a threshold quality (e.g., depict a glare over the barcode, depict a blurry identifier, etc.), and/or depict an identifier that that does not satisfy a threshold size (e.g., the identifier was a far distance from the camera).

For instance, and in the example of FIG. 3, the system(s) 114 may remove the second image 302(2), the seventh image 302(7), the third image 308(3), and the seventh image 308(7) since these images 302, 308 depict an occlusion blocking the identifier. The removing of these images 302, 308 is represented by the crosses through the images 302, 308. Additionally, the system(s) 114 may remove the fourth image 302(4), the ninth image 302(9), the fourth image 308(4), the fifth image 308(5), and the ninth image 308(9) since these images 302, 308 depict only a portion of the identifier. The removing of these images 302, 308 is again represented by the crosses through the images 302, 308.

Next, the system(s) 114 may remove images 302, 308 that are associated with confidence levels that do not satisfy the threshold confidence level. For instance, and again in the example of FIG. 3, the system(s) 114 may remove the first image 302(1) (e.g., confidence level of 83%) and the second image 308(2) (e.g., confidence level of 96%) since the confidence levels of these images 302, 308 do not satisfy the threshold confidence level. The removing of these images 302, 308 is also represented by the crosses through the images 302, 308. Based on the filtering of the images 302, 308, the system(s) 114 may then use the additional data 306, 310 associated with the remaining images 302, 308 to determine ground truth result for the fifth image 302(5).

For example, the system(s) 114 may generate a list associated with the results of the remaining images 302, 308, where the list indicates the number of images 302, 308 that are associated with each result. For instance, and in the example of FIG. 3, the list may indicate that the result "1" is associated with five images 302, 308, the result "2" is associated with two images 302, 308, and the result "3" is associated with one image 302, 308. The system(s) 114 may then use the list to determine the ground truth result. For instance, and in some examples, the system(s) 114 may initially remove any results that are associated with a number of images that is less than a threshold number of images. The threshold number of images may include, but is not limited to, one image, two images, five images, and/or any other number of images. For example, the system(s) 114 may remove the result "3" since only one image 302, 308 is associated with the result "3". This leaves the list to include the result "1" and the result "2".

In some examples, the system(s) 114 may then verify the result "1" that is associated with the greatest number of images 302, 308, using one or more of the processes described herein. If the system(s) 114 verify the result "1", then the system(s) 114 may determine that the ground truth result includes the result "1". However, if the system(s) 114 are unable to verify the result "1", then the system(s) 114 may verify the result "2" that is associated with the second greatest number of images 302, 308, using the one or more processes. Again, if the system(s) 114 verify the result "2", then the system(s) 114 may determine that the ground truth result includes the result "2". However, if the system(s) 114 are unable to verify the result "2", then the system(s) 114 may determine that the ground truth result may not be determined for the fifth image 302(5).

While the example of FIG. 3 illustrates using images 302, 308 associated with two cameras 304(1)-(2), in other examples, the system(s) 114 may use images associated with any number of cameras (e.g., one camera, two cameras, four cameras, ten cameras, and/or the like). Additionally, in some examples, one or more of the cameras may not be associated with the tote 104. For example, one or more of the cameras may be located outside of the tote 104, but still generate video data representing the area around the tote 104.

Figure 4:
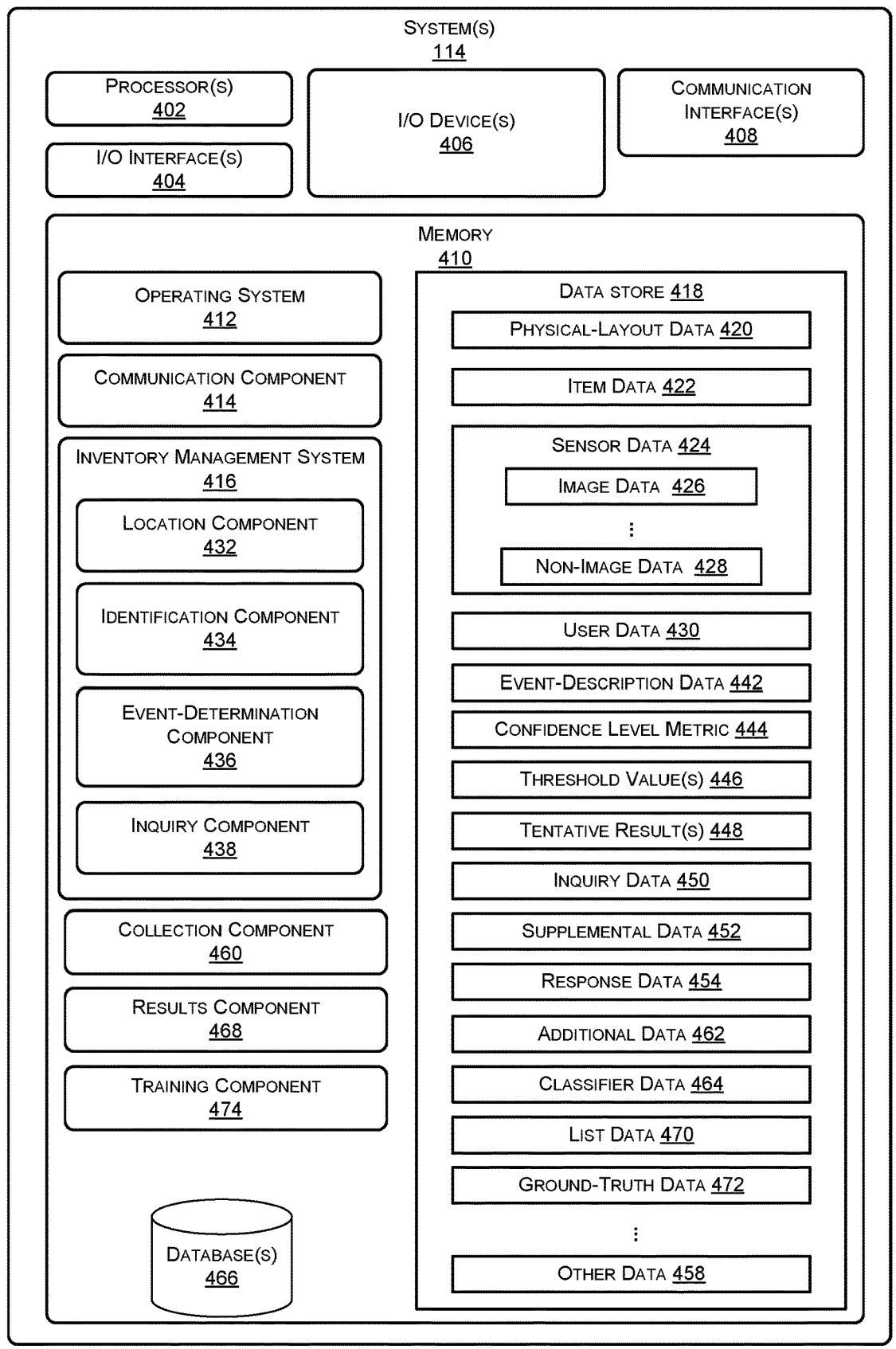
FIG. 4 illustrates a block diagram of one or more systems configured to collect image data, in accordance with examples of the present disclosure.

FIG. 4 illustrates a block diagram of the system(s) 114. The system(s) 114 may be physically present at the facility 102, may be accessible by the network(s) 118, or a combination of both. The system(s) 114 do not require end-user knowledge of the physical location and configuration of the system that delivers the services. Common expressions associated with the system(s) 114 may include "on-demand computing," "software as a service (SaaS)," "cloud services," "data centers," "remote system(s)", and so forth. Services provided by the system(s) 114 may be distributed across one or more physical or virtual devices.

The system(s) 114 may include one or more hardware processors 402 (processors) configured to execute one or more stored instructions. The processor(s) 402 may comprise one or more cores. The system(s) 114 may include one or more input/output (I/O) interfaces 404 to allow the processor 402 or other portions of the system(s) 114 to communicate with other devices. The I/O interface(s) 404 may comprise Inter-Integrated Circuit (I2C), Serial Peripheral Interface bus (SPI), Universal Serial Bus (USB) as promulgated by the USB Implementers Forum, and so forth.

The system(s) 114 may also include one or more communication interfaces 408. The communication interface(s) 408 are configured to provide communications between the system(s) 114 and other devices, such as sensors, the interface devices, routers, and so forth. The communication interface(s) 408 may include devices configured to couple to personal area networks (PANs), wired and wireless local area networks (LANs), wired and wireless wide area networks (WANs), and so forth. For example, the communication interface(s) 408 may include devices compatible with Ethernet, Wi-Fi™, and so forth. The system(s) 114 may also include one or more busses or other internal communications hardware or software that allow for the transfer of data between the various modules and components of the servers 832.

The system(s) 114 may further include one or more memories 410. The memory 410 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 410 provides storage of computer-readable instructions, data structures, program modules, and other data for the operation of the system(s) 114. A few example functional modules are shown stored in the memory 410, although the same functionality may alternatively be implemented in hardware, firmware, or as a system on a chip (SOC).

The memory 410 may include at least one operating system (OS) component 412. The OS component 412 is configured to manage hardware resource devices such as the I/O interface(s) 404, the communication interface(s) 408, and provide various services to applications or components executing on the processor(s) 402. The OS component 412 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 410. These components may be executed as foreground applications, background tasks, daemons, and so forth. One or more communication components 414 may be configured to establish communications with one or more of the sensors, one or more of the devices used by associates, other system(s) 114, the tote 104, or other devices. The communications may be authenticated, encrypted, and so forth.

The memory 410 may store an inventory management system 416. The inventory management system 416 is configured to provide the inventory functions as described herein. For example, the inventory management system 416 may track movement of items in the facility 102, generate user interface data, and so forth.

The inventory management system 416 may access information stored in one or more data stores 418 in the memory 410. The data store(s) 418 may use a flat file, database, linked list, tree, executable code, script, or other data structure to store the information. In some implementations, the data store(s) 418 or a portion of the data store(s) 418 may be distributed across one or more other devices including other servers 832, network attached storage devices, and so forth.

The data store(s) 418 may include physical layout data 420. The physical layout data 420 provides a mapping of physical locations within the physical layout of devices and objects such as the sensors, inventory locations, and so forth. The physical layout data 420 may indicate the coordinates within the facility 102 of an inventory location, sensors within view of that inventory location, and so forth. For example, the physical layout data 420 may include camera data comprising one or more of a location within the facility of a camera, orientation of the camera, the operational status, and so forth. Continuing example, the physical layout data 420 may indicate the coordinates of the camera, pan and tilt information indicative of a direction that the field of view is oriented along, whether the camera is operating or malfunctioning, and so forth.

In some implementations, the inventory management system 416 may access the physical layout data 420 to determine if a location associated with the event is within the field of view of one or more sensors. Continuing the example above, given the location within the facility 102 of the event and the camera data, the inventory management system 416 may determine the cameras that may have generated images of the event.

The item data 422 comprises information associated with the items. The information may include information indicative of one or more inventory locations at which one or more of the items are stored. The item data 422 may also include order data, SKU or other product identifier (e.g., barcode), price, quantity on hand, weight, expiration date, images of the item, detail description information, ratings, ranking, and so forth. The inventory management system 416 may store information associated with inventory management functions in the item data 422.

The data store(s) 418 may also include sensor data 424. The sensor data 424 comprises information acquired from, or based on, the one or more sensors located within the facility 102. For example, the sensor data may comprise 3D information about an object in the facility. As described above, the sensors may include a camera, which is configured to acquire one or more images. These images may be stored as image data 426 (which may also represent the video data described herein). The image data 426 may comprise information descriptive of a plurality of picture elements or pixels. Non-image data 428 may comprise information from other sensors, such as input from microphones, weight sensors, and so forth.

User data 430 may also be stored in the data store(s) 418. The user data 430 may include identity data, information indicative of a profile, purchase history, location data, and so forth. Individual users or groups of users may selectively provide user data 430 for use by the inventory management system 416. The individual users or groups of users may also authorize collection of the user data 430 during use of the facility 102 or access to user data 430 obtained from other systems. For example, the user may opt-in to collection of the user data 430 to receive enhanced services while using the facility 102.

In some implementations, the user data 430 may include information designating a user for special handling. For example, the user data 430 may indicate that a particular user has been associated with an increased number of errors with respect to output data. The inventory management system 416 may be configured to use this information to apply additional scrutiny to the events associated with this user. For example, events that include an item having a cost or result above the threshold amount may be provided to a facility associate for processing regardless of the determined level of confidence in the output data as generated by the automated system.

The inventory management system 416 may include one or more of a location component 432, identification component 434, event-determination component 436, and an inquiry component 438.

The location component 432 functions to locate items or users within the environment of the facility to allow the inventory management system 416 to assign certain events to the correct users. That is, the location component 432 may assign unique identifiers to users as they enter the facility 102 and, with the users' consent, may locate the users throughout the facility 102 over the time they remain in the facility 102. The location component 432 may perform this locating using sensor data 424, such as the image data 426. For example, the location component 432 may receive the image data 426 and may use techniques to identify users from the images. After identifying a particular user within the facility 102, the location component 432 may then locate the user within the images as the user moves throughout the facility 102. Further, should the location component 432 temporarily "lose" a particular user, the location component 432 may again attempt to identify the users within the facility based on techniques.

Therefore, upon receiving the indication of the time and location of the event in question, the location component 432 may query the data store 418 to determine which one or more users were at or within a threshold distance of the location of the event at the particular time of the event. Further, the location component 432 may assign different confidence levels to different users, with the confidence levels indicating how likely it is that each corresponding user is the user that is in fact associated with the event of interest.

The location component 432 may access the sensor data 424 in order to determine this location data of the user and/or items. The location data provides information indicative of a location of an object, such as the item, the user, the tote 104, and so forth. The location may be absolute with respect to the facility 102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 102, 5.2 m from an inventory location along a heading of 164°, and so forth. For example, the location data may indicate that the user is 25.2 m along the aisle and standing in front of the inventory location. In comparison, a relative location may indicate that the user is 32 cm from the tote 104 at a heading of 73° with respect to the tote 104. The location data may include orientation information, such as which direction the user is facing. The orientation may be determined by the relative direction the user's body is facing. In some implementations, the orientation may be relative to the interface device. Continuing the example, the location data may indicate that the user is oriented with a heading of 0°, or looking north. In another example, the location data may indicate that the user is facing towards the interface device.

The identification component 434 is configured to identify an object. In one implementation, the identification component 434 may be configured to identify an item. In another implementation, the identification component 434 may be configured to identify the user. For example, the identification component 434 may use one or more techniques to process the image data 426 and determine the user depicted in the images by comparing the characteristics in the image data 426 with previously stored results. The identification component 434 may also access data from other sensors, such as from an RFID reader, an RF receiver, and so forth.

The event-determination component 436 is configured to process the sensor data 424 and generate output data, and may include components described above. The event-determination component 436 may access information stored in the data store(s) 418 including, but not limited to, event-description data 442, confidence levels 444, or threshold values 446. In some instances, the event-determination component 436 may be configured to perform some or all of the techniques described above with regards to the event-determination component 436. For instance, the event-determination component 436 may be configured to create and utilize event classifiers for identifying events (e.g., predefined activity) within image data, potentially without use of other sensor data acquired by other sensors in the environment.

The event-description data 442 comprises information indicative of one or more events. For example, the event-description data 442 may comprise predefined profiles that designate movement of an item from an inventory location with the event of "pick". The event-description data 442 may be manually generated or automatically generated. The event-description data 442 may include data indicative of triggers associated with events occurring in the facility 102. An event may be determined as occurring upon detection of the trigger. For example, sensor data 424 such as a change in weight from a weight sensor at an inventory location may trigger detection of an event of an item being added or removed from the inventory location. In another example, the trigger may comprise an image of the user reaching a hand toward the inventory location. In yet another example, the trigger may comprise two or more users approaching to within a threshold distance of one another.

The event-determination component 436 may process the sensor data 424 using one or more techniques including, but not limited to, artificial neural networks, classifiers, decision trees, support vector machines, Bayesian networks, and so forth. For example, the event-determination component 436 may use a decision tree to determine occurrence of the "pick" event based on sensor data 424. The event-determination component 436 may further use the sensor data 424 to determine one or more tentative results 448. The one or more tentative results 448 comprise data associated with the event. For example, where the event comprises a disambiguation of users, the tentative results 448 may comprise a list of possible user identities. In another example, where the event comprises a disambiguation between items, the tentative results 448 may comprise a list of possible item identifiers. In some implementations, the tentative result 448 may indicate the possible action. For example, the action may comprise the user picking, placing, moving an item, damaging an item, providing gestural input, and so forth.

In some implementations, the tentative results 448 may be generated by other components. For example, the tentative results 448 such as one or more possible identities or locations of the user involved in the event may be generated by the location component 432. In another example, the tentative results 448 such as possible items that may have been involved in the event may be generated by the identification component 434.

The event-determination component 436 may be configured to provide a confidence level 444 associated with the determination of the tentative results 448. The confidence level 444 provides indicia as to the expected level of accuracy of the tentative result 448. For example, a low confidence level 444 may indicate that the tentative result 448 has a low probability of corresponding to the actual circumstances of the event. In comparison, a high confidence level 444 may indicate that the tentative result 448 has a high probability of corresponding to the actual circumstances of the event.

In some implementations, the tentative results 448 having confidence levels 444 that exceed the threshold may be deemed to be sufficiently accurate and thus may be used as the output data. For example, the event-determination component 436 may provide tentative results 448 indicative of the three possible items corresponding to the "pick" event. The confidence levels 444 associated with the possible items may be 25%, 70%, 42%, respectively. Continuing the example, the threshold value 446 may be set such that confidence level 444 of 40% are deemed to be sufficiently accurate. As a result, the event-determination component 436 may designate the "pick" event as involving an item.

The inquiry component 438 may be configured to use at least a portion of the sensor data 424 associated with the event to generate inquiry data 450. In some implementations, the inquiry data 450 may include one or more of the tentative results 448 or supplemental data 452. The inquiry component 438 may be configured to provide inquiry data 450 to one or more devices associated with one or more human associates.

An associate user interface is presented on the respective devices of associates. The associate may generate response data 454 by selecting a particular tentative result 448, entering new information, indicating that they are unable to answer the inquiry, and so forth.

The supplemental data 452 comprises information associated with the event or that may be useful in interpreting the sensor data 424. For example, the supplemental data 452 may comprise previously stored images of the items. In another example, the supplemental data 452 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 426 during presentation to an associate.

The inquiry component 438 processes the response data 454 provided by the one or more associates. The processing may include calculating one or more statistical results associated with the response data 454. For example, statistical results may include a count of the number of times associates selected a particular tentative result 448, determination of a percentage of the associates that selected a particular tentative result 448, and so forth.

The inquiry component 438 is configured to generate the output data based at least in part on the response data 454. For example, given that a majority of the associates returned response data 454 indicating that the item associated with the "pick" event is item, the output data may indicate that the item was picked.

The inquiry component 438 may be configured to selectively distribute inquiries to particular associates. For example, some associates may be better suited to answering particular types of inquiries. Performance data, such as statistical data about the performance of the associates, may be determined by the inquiry component 438 from the response data 454 provided by the associates. For example, information indicative of a percentage of different inquiries in which the particular associate selected response data 454 that disagreed with the majority of associates may be maintained. In some implementations, test or practice inquiry data 450 having a previously known correct answer may be provided to the associate for training or quality assurance purposes. The determination of the set of associates to use may be based at least in part on the performance data.

By using the inquiry component 438, the event-determination component 436 may be able to provide high reliability output data that accurately represents the event. The output data generated by the inquiry component 438 from the response data 454 may also be used to further train the automated systems used by the inventory management system 416. For example, the sensor data 424 and the output data, based on response data 454, may be provided to one or more of the components of the inventory management system 416 for training in process improvement. Continuing the example, this information may be provided to an artificial neural network, Bayesian network, and so forth, to further train these systems such that the confidence level 444 and the tentative results 448 produced in the future for the same or similar input is improved. Finally, as FIG. 4 illustrates, the system(s) 114 may store and/or utilize other data 458.

As further illustrated in FIG. 4, the system(s) 114 may include a collection component 460. The collection component 460 may be configured to analyze the image data 426 representing the images (e.g., the images 110, the images 204, the images 302, the images 308, etc.) in order to filter out images that may be unreadable by the reader. For example, the collection component 460 may be configured to remove images that depict an occlusion blocking a portion of the identifier, depict only a portion of the identifier (e.g., only a portion of the bars or the digits of a barcode), include an image quality that does not satisfy a threshold quality (e.g., depict a glare over the barcode, depict a blurry identifier, etc.), and/or depict an identifier that that does not satisfy a threshold size (e.g., the identifier was a far distance from the camera). In some examples, the collection component 460 further filters the images using a CNR for the images. In such examples, the CNR may be computed by dividing the image contrast by a standard deviation, where the image contrast may be computed using a Haralick feature. Additionally, the collection component 460 may remove images that include SNRs that do not satisfy a threshold, such as one. However, in other examples, the collection component 460 may use a threshold other than one.

The collection component 460 may then be configured to analyze additional data 462 that is associated with the image data 426 in order to identify the images that are associated with confidence levels that do not satisfy a threshold confidence level. As described herein, the collection component 460 may identify these images as potential images for training classifier(s) (which are represented by the classifier data 964) that are used by devices, such as the tote 104, to identify the identifiers located on items. In some examples, the collection component 460 may be configured to store the image data 426 representing these images in databases(s) 466.

A results component 468 may then be configured to perform the processes described herein in order to determine ground truth results for the identified images. For example, and for an image, the results component 468 may be configured to analyze the additional data 462 in order to identify additional images that are associated with confidence levels that satisfy the threshold confidence level, where the additional images likely depict the same identifier as the image. The results component 468 may then be configured to generate, using the additional data 462, the list of results for the image, where the list is represented by list data 470. Additionally, the results component 468 may be configured to analyze the list in order to determine a result for the images. In some examples, the results component 468 may perform one or more of the verification processes described herein in order to verify the result before determining that the result includes the ground truth result for the image.

The results component 468 may further be configured to generate ground-truth data 472 representing the ground truth result for the image. In some examples, the results component 468 may store the ground-truth data 472 in the database(s) 466 and/or in association with the image data 426 that represents the image. Additionally, the results component 468 may be configured to perform similar processes in order to determine the ground truth results for one or more of the images identified by the collection component 460. This way, the collection component 460 and the results component 468 are able to generate a database of data that may be used to train the classifier(s).

For example, a training component 474 may be configured to use the data stored in the databases(s) 466, such as the image data 426 representing the images and the ground-truth data 472 representing the ground truth results, to train the classifier(s). After training the classifier(s), the training component 474 may further be configured to test the classifier(s) in order to determine whether the training improved the accuracy of the classifier(s). For example, the training component 474 may be configured to determine a first accuracy of the results of the classifier(s) after the training and compare the first accuracy to a second accuracy of the classifier(s) before the training. The training component 474 may then determine that the accuracy of the classifier(s) has improved when the first accuracy is greater than the second accuracy. In response, the system(s) 114 may be configured to send, to the tote 104 and/or one or more other devices, the classifier data 464 representing the updated classifier(s).

FIGS. 5-8 illustrate various processes for storing image data representing identifiers. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 5:
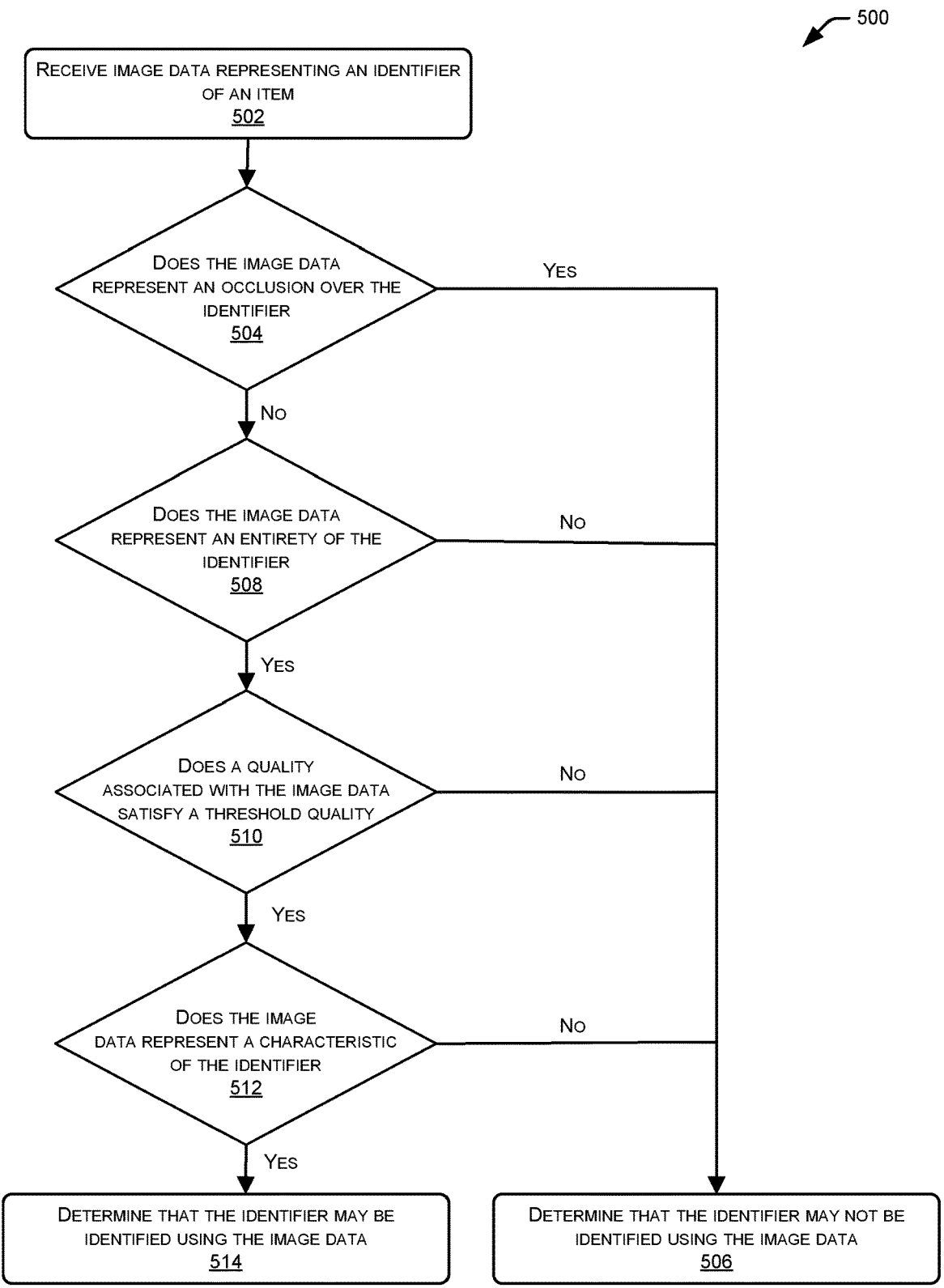
FIG. 5 illustrates a flow diagram of an example process for collecting image data representing an identifier, in accordance with examples of the present disclosure.

FIG. 5 illustrates a flow diagram of an example process 500 for filing image data representing an identifier, in accordance with examples of the present disclosure. At 502, the process 500 may include receiving image data representing an identifier of an item. For instance, the system(s) 114 may receive the image data from the tote 104. In some examples, the image data may represent an image depicting the identifier of an item. For example, the tote 104 may generate the image data to represent a portion of a frame of video, where the portion of the frame depicts the identifier of the item. However, in other examples, the image data may represent the entire frame of the video. Additionally, in some examples, the system(s) 114 may receive additional data from the tote 104. The additional data may represent a result for the identifier (e.g., a string of characters for the barcode) as determined by the reader component using the image data, a confidence level associated with the result, an indication of the frame that was used to generate the image data, an identifier of the camera that generated the video, and/or any other information associated with the image data.

At 504, the process 500 may include determining whether the image data represents an occlusion over the identifier. For instance, the system(s) 114 may analyze the image data in order to determine whether the image data represents the occlusion over the identifier. The occlusion may include, but is not limited to, a portion of a user that is placing the item in the tote 104, another item within the tote 104, and/or any other occlusion. If, at 504, it is determined that the image data represents the occlusion over the identifier, then at 506, the process 500 may include determining that the identifier may not be identified using the image data. For instance, if the system(s) 114 determine that the image data represents the occlusion over the identifier, then the system(s) 114 may determine that the identifier may not be identified using the image data.

However, if, at 504, it is determined that the image data does not represent the occlusion over the identifier, then at 508, the process 500 may include determining if the image data represents an entirety of the identifier. For instance, if the system(s) 114 determine that the image data does not represent the occlusion over the identifier, then the system(s) 114 may determine if the image data represents an entirety of the identifier. For examples, the system(s) 114 may determine whether a portion of the identifier, such as a corner of the identifier, is not represented by the image data. If, at 508, it is determined that the image data does not represent the entirety of the identifier, then again at 506, the process 500 may include determining that the identifier may not be identified using the image data. For instance, if the system(s) 114 determine that the image data does not represent the entirety of the identifier, then the system(s) 114 may again determine that the identifier may not be identified using the image data.

However, if, at 508, it is determined that the image data does represent the entirety of the identifier, then at 510, the process 500 may include determining if a quality associated with the image data satisfies a threshold quality. For instance, if the system(s) 114 determine that the image data represents the entirety of the identifier, then the system(s) 114 may determine if the quality satisfies the threshold quality. In some examples, the system(s) 114 may determine that the quality satisfies the threshold quality based on the image data not representing glare over the identifier, a size of the identifier being equal to or greater than a threshold size, and/or the like. If, at 510, it is determined that the quality does not satisfy the threshold quality, then again at 506, the process 500 may include determining that the identifier may not be identified using the image data. For instance, if the system(s) 114 determine that the quality does not satisfy the threshold quality, then the system(s) 114 may again determine that the identifier may not be identified using the image data.

However, if, at 510, it is determined that the quality satisfies the threshold quality, then at 512, the process 500 may include determining whether the image data represents a characteristic of the identifier. For instance, if the system(s) 114 determine that the quality satisfies the threshold quality, then the system(s) 114 may determine if the image data represents a characteristic of the identifier that is important for identifying the identifier. For example, and in examples where the identifier is a barcode, the system(s) 114 may determine whether the image data represents the bars and/or digits of the barcode. If, at 512, it is determined that the image data does not represent the characteristic, then again at 506, the process 500 may include determining that the identifier may not be identified using the image data. For instance, if the system(s) 114 determine that the image data does not represent the characteristic, then the system(s) 114 may again determine that the identifier may not be identified using the image data.

However, if at 512, it is determined that the image data does represent the characteristic, then at 514, the process 500 may include determining that the identifier may be identified using the image data. For instance, if the system(s) 114 determine that the image data represents the characteristic, then the system(s) 114 may determine that the identifier may be identified using the image data. In some examples, the system(s) 114 may then process the image data using one or more of the processes described herein. Additionally, in some examples, the system(s) 114 may store the image data in one or more databases.

While the example process 500 illustrates an order for 504, 508, 510, and 512, in other examples, the example process 500 may use a different order for 504, 508, 510, and/or 512. Additionally, in some examples, the example process 500 may simultaneously perform 504, 508, 510, and/or 512.

Figure 6:
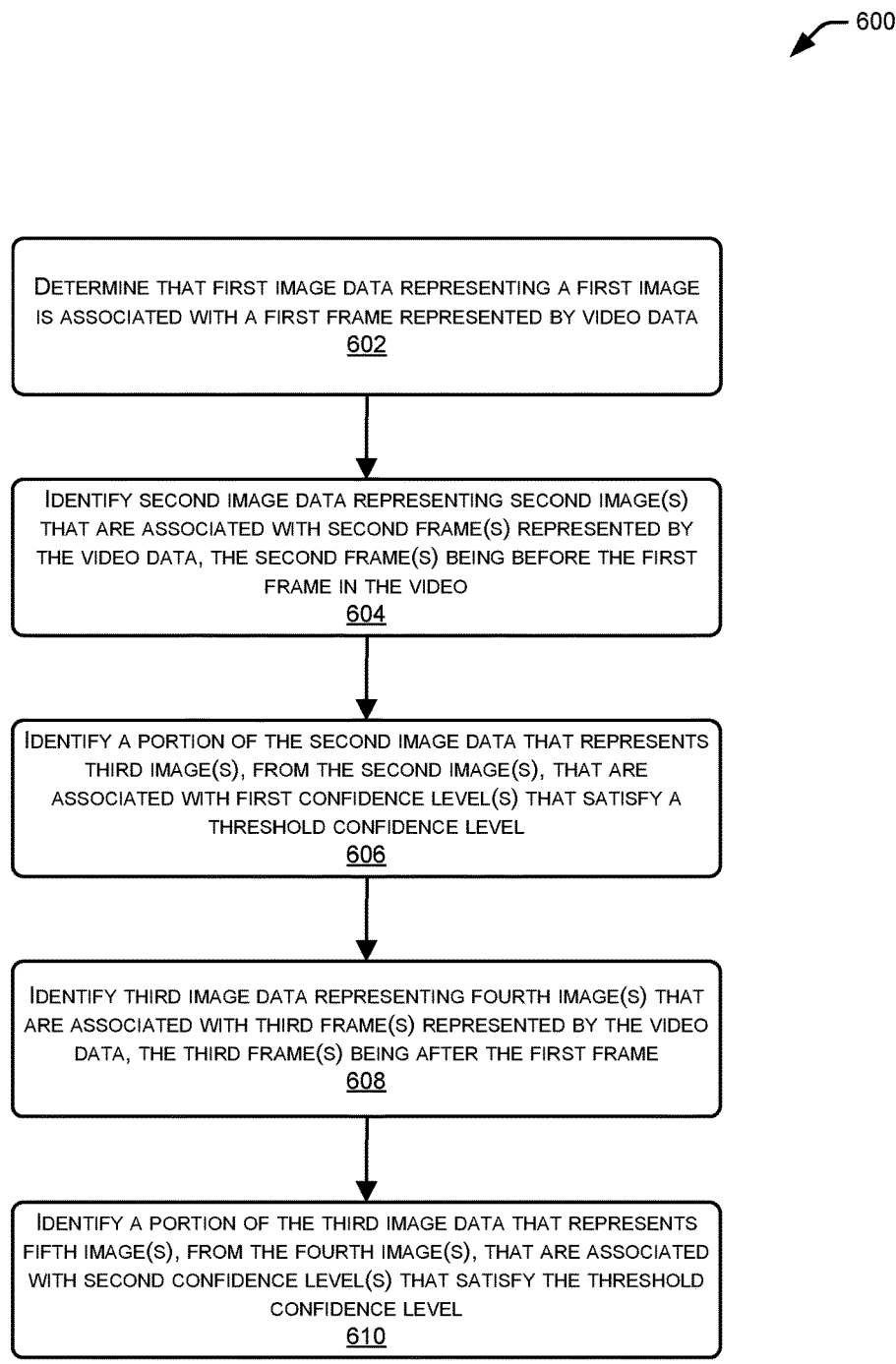
FIG. 6 illustrates a flow diagram of an example process for identifying image data for determining a ground truth result, in accordance with examples of the present disclosure.

FIG. 6 illustrates a flow diagram of an example process 600 for identifying image data for determining a ground truth result, in accordance with examples of the present disclosure. At 602, the process 600 may include determining that first image data representing a first image is associated with a first frame represented by video data. For instance, the system(s) 114 may receive the first image data from the tote 104. In some examples, the system(s) 114 may also receive video data representing a video from the tote 104, where the tote 104 generated the first image data using the video data. The system(s) 114 may then analyze additional data in order to determine that the first image data is associated with a confidence level that does not satisfy a threshold confidence level. Based on the determination, the system(s) 114 may analyze the additional data to determine that the first image data was generated using the first frame represented by the video data.

At 604, the process 600 may include identifying second image data representing second image(s) that are associated with second frame(s) represented by the video data, the second frame(s) being before the first frame in the video. For instance, the system(s) 114 may analyze the additional data in order to identify the second image data representing the second image(s) that are associated with the second frame(s). In other words, the system(s) 114 may identify the second image(s) that are associated with the second frame(s) that were generated before the first frame and as such, likely depict the same identifier as the first frame. In some examples, the system(s) 114 may also identify image data representing image(s) that are associated with frame(s) of another video, where the other video was generated by another camera of the tote 104. This is because the frame(s) of the other video are also likely to depict the identifier.

At 606, the process 600 may include identifying a portion of the second image data that represents third image(s), from the second image(s), that are associated with first confidence level(s) that satisfy a threshold confidence level. For instance, the system(s) 114 may analyze the additional data in order to determine the first confidence level(s) associated with the second frame(s) that are represented by the second image data. The system(s) 114 may then determine that the portion of the second image data, which represents the third frame(s), are associated with the first confidence level(s) that are equal to or greater than the threshold confidence level. In other words, the system(s) 114 may identify the third frame(s) that the system(s) 114 may use to identify the identifier depicted by the first image.

At 608, the process 600 may include identifying third image data representing fourth image(s) that are associated with third frame(s) represented by the video data, the fourth frame(s) being after the first frame in the video. For instance, the system(s) 114 may analyze the additional data in order to identify the third image data representing the fourth image(s) that are associated with the third frame(s). In other words, the system(s) 114 may identify the fourth image(s) that are associated with the third frame(s) that were generated after the first frame and as such, also likely depict the same identifier as the first frame.

At 610, the process 600 may include identifying a portion of the third image data that represents fifth image(s), from the fourth image(s), that are associated with second confidence level(s) that satisfy the threshold confidence level. For instance, the system(s) 114 may analyze the additional data in order to determine the second confidence level(s) associated with the fourth frame(s) that are represented by the second image data. The system(s) 114 may then determine that the portion of the second image data, which represents the fifth frame(s), are associated with the second confidence level(s) that are equal to or greater than the threshold confidence level. In other words, the system(s) 114 may identify the fifth frame(s) that the system(s) 114 may use to identify the identifier depicted by the first image.

Figure 7:
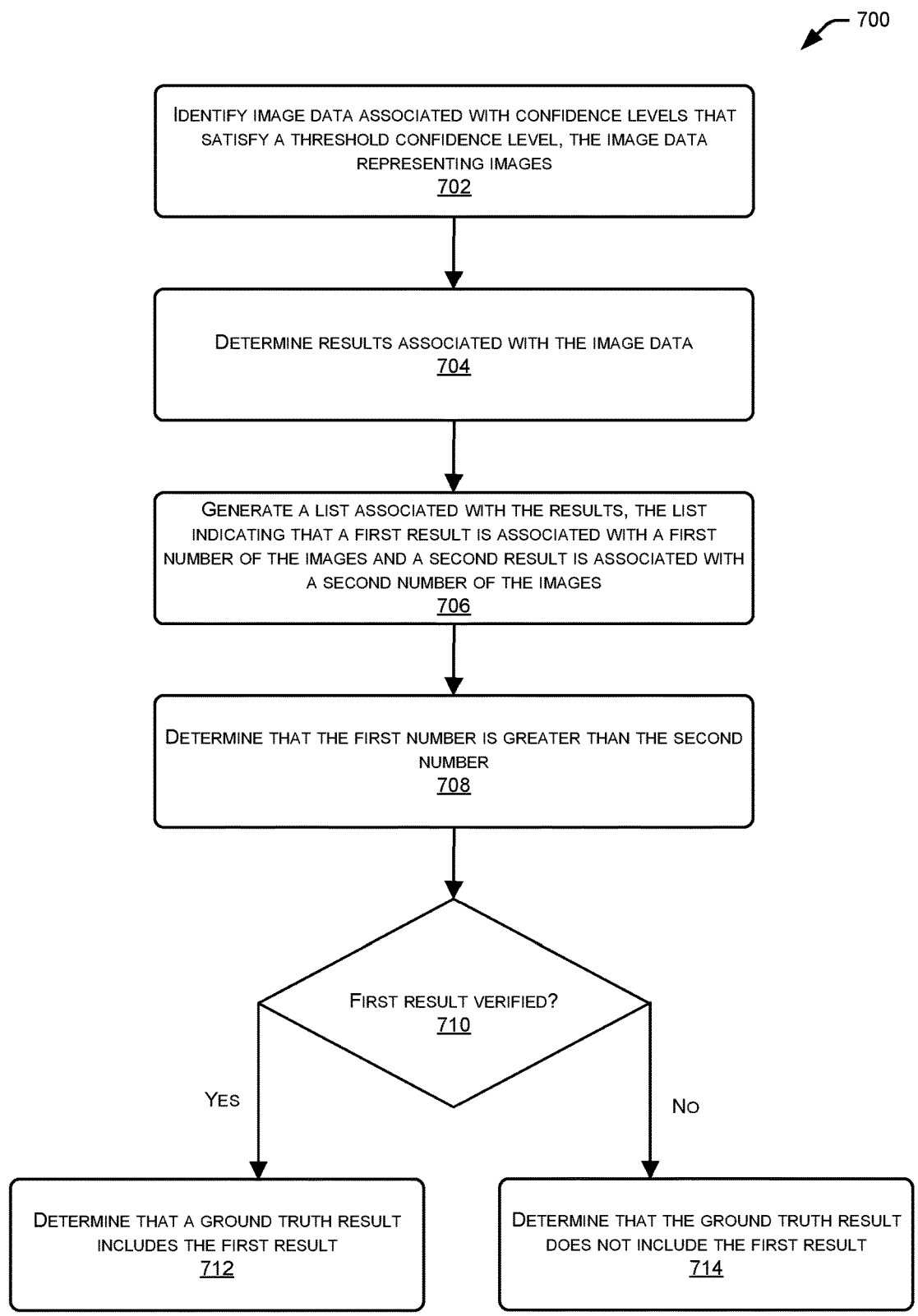
FIG. 7 illustrates a flow diagram of an example process for generating a list for determining a ground truth result, in accordance with examples of the present disclosure.

FIG. 7 illustrates a flow diagram of an example process 700 for generating a list for determining a ground truth result, in accordance with examples of the present disclosure. At 702, the process 700 may include identifying image data associated with confidence levels that satisfy a threshold confidence level, the image data representing images. For instance, the system(s) 114 may identify the image data that is associated with the confidence levels that satisfy the threshold confidence level. In some examples, the system(s) 114 may identify the image data using the example process 600 of FIG. 6. In some examples, the system(s) 114 may identify the image data in order to use the image data to determine a ground truth result associated with additional image data representing an additional image.

At 704, the process 700 may include determining results associated with the image data and at 706, the process 700 may include generating a list associated with the results, the list indicating that a first result is associated with a first number of the images and that a second result is associated with a second number of the images. For instance, the system(s) 114 may analyze the additional data in order to determine the results associated with the image data. The system(s) 114 may then generate the list using the results. For example, the system(s) 114 may analyze the results in order to determine the first result is associated with the first number of images and that the second result is associated with the second number of images. The system(s) 114 may then generate the list to indicate that the first result is associated with the first number of images and that the second result is associated with the second number of images.

At 708, the process 700 may include determining that the first number is greater than the second number and at 710, the process 700 may include determining whether the first result is verified. For instance, the system(s) 114 may analyze the list in order to determine that the first number associated with the first result is greater than the second number associated with the second result. In other words, the system(s) 114 may determine that the first result is associated with the greatest number of images. The system(s) 114 may then analyze the first result in order to attempt to verify the first result as an action result for the identifier.

For a first example, such as when the first result includes a string of characters, the system(s) 114 may verify the string of characters by determining that the string of characters includes the correct number of digits (e.g., 8 digits, 10 digits, 12 digits, etc.) for barcodes. For a second example, the system(s) 114 may verify the first result by determining that the first result is associated with an item that is provided at the facility. For instance, and again when the first result includes the string of characters, the system(s) may determine that the string of characters matches an actual barcode of an actual item at the facility. While these are just a couple example techniques of how the system(s) 114 may verify the first result, in other example, the system(s) may perform additional and/or alternative verification techniques.

If, at 710, it is determined that the first result is verified, then at 712, the process 700 may include determining that a ground truth result includes the first result. For instance, if the system(s) 114 determine that the first result is verified, then the system(s) 114 may determine that the ground truth result includes the first result. Additionally, in some examples, the system(s) 114 may store data representing the ground truth result in association with additional image data representing an additional image.

However, if, at 710, it is determined that the first result is not verified, then at 714, the process 700 may include determining that the ground truth result does not include the first result. For instance, if the system(s) 114 determine that the first result is not verified, then the system(s) may determine that the ground truth result does not include the first result. In some examples, the system(s) 114 may then attempt to verify the second result and, if the system(s) 114 verify the second result, the system(s) 114 may determine that the ground truth result includes the second result. However, in other examples, the system(s) 114 may determine that the ground truth result cannot be determined for the additional image data.

Figure 8:
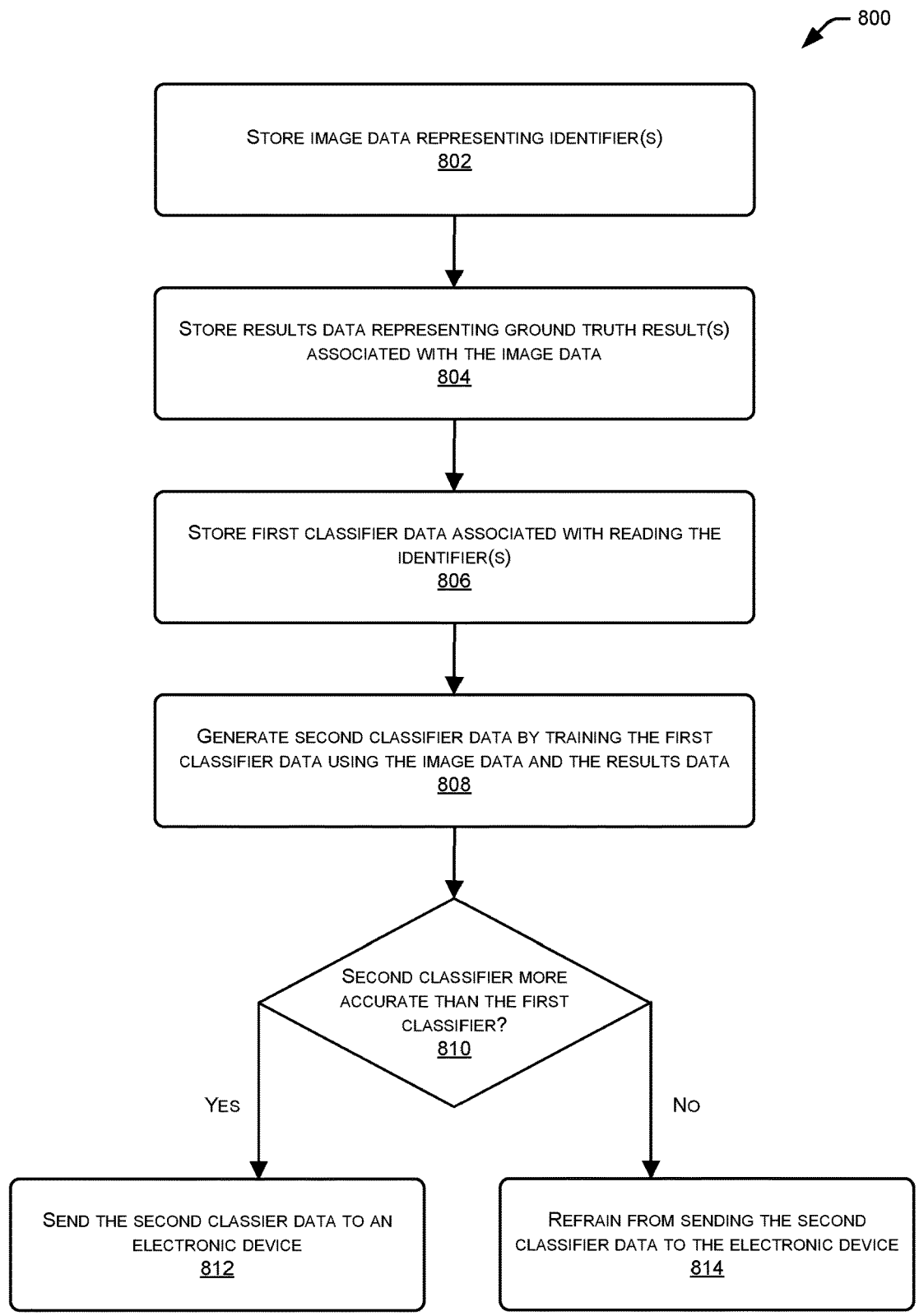
FIG. 8 illustrates a flow diagram of an example process for training classifier(s) that are used to analyze identifier(s), in accordance with examples of the present disclosure.

FIG. 8 illustrates a flow diagram of an example process 800 for training classifier(s) associated with identifier(s), in accordance with examples of the present disclosure. At 802, the process 800 may include storing image data representing identifier(s) and at 804, the process 800 may include storing results data representing ground truth result(s) associated with the image data. For instance, the system(s) 114 may perform one or more of the processes described herein to store in the image data in one or more databases, where the image data is associated with confidence level(s) that do not satisfy a threshold confidence level. Additionally, the system(s) 114 may perform one or more of the processes described herein to determine the ground truth result(s) associated with the image data. The system(s) 114 may then store, in the database(s), the results data representing the ground truth result(s).

At 806, the process 800 may include storing first classifier data associated with reading the identifier(s) and at 808, the process 800 may include generating second classifier data by training the first classifier data using the image data and the results data. For instance, the system(s) 114 may store the first classifier data that at least one device uses to identify the identifier(s) on item(s). The system(s) 114 may then train the first classifier data by at least processing the image data and the results data using the first classifier data. Based on the training, the system(s) 114 may generate the second classifier data, which includes an updated version of the first classifier data. The system(s) 114 may then store the second classifier data.

At 810, the process 800 may include determining whether the second classifier data is more accurate than the first classifier data. For instance, the system(s) 114 may have initially generated first results using the first classifier data. The system(s) 114 may then have analyzed the first results to determine a first accuracy of the first results. Next, the system(s) 114 may generate second results using the second classifier data. The system(s) 114 may then analyze the second results to determine a second accuracy of the second results. Using the first accuracy and the second accuracy, the system(s) 114 may determine whether the second classifier data is more accurate than the first classifier data. For example, the system(s) 114 may determine that the second classifier data is more accurate than the first classifier data when the second accuracy is greater than the first accuracy, but determine that the second classifier data is less accurate than the first classifier data when the second accuracy is less than the first accuracy.

If, at 810, it is determined that the second classifier data is more accurate than the first classifier data, then at 812, the process 800 may include sending the second classifier data to an electronic device. For instance, if the system(s) 114 determine that the second classifier data is more accurate than the first classifier data, then the system(s) 114 may send the second classifier data to the electronic device. The electronic device may then use the second classifier data to identify other identifier(s) on items.

However, if, at 810, it is determined that the second classifier data is not more accurate than the first classifier data, then at 814, the process 800 may include refraining from sending the second classifier data to the electronic device. For instance, if the system(s) 114 determine that the second classifier data is not more accurate than the first classifier data, then the system(s) 114 may refrain from sending the second classifier data to the electronic device. Additionally, in some examples, the system(s) 114 may continue to perform the training using additional image data and/or additional results data.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method comprising:
storing first image data representing an identifier;
storing second image data representing the identifier;
determining a first confidence level associated with the first image data, the first confidence level associated with a first result for the identifier as determined by a first classifier using the first image data;
determining that the first confidence level is less than a threshold confidence level;
determining that the first image data is associated with a first time;
determining that the second image data is associated with a second time, the second time being associated with the first time;
based at least in part on the second time being associated with the first time, determining a second confidence level associated with the second image data, the second confidence level associated with a second result for the identifier as determined by the first classifier using the second image data;
determining that the second confidence level is equal to or greater than the threshold confidence level;
based at least in part on the second confidence level being equal to or greater than the threshold confidence level, associating the first image data with the second result; and
generating a second classifier by at least training the first classifier using the first image data and the second result.

2. The method as recited in claim 1, further comprising:
storing third image data representing the identifier;
determining a third confidence level associated with the third image data, the third confidence level associated with a third result for the identifier as determined by the first classifier using the third image data;
determining that the third confidence level is equal to or greater than the threshold confidence level; and
determining that the first image data represents the second result based at least in part on both the second confidence level and the third confidence level being equal to or greater than the threshold confidence level.

3. The method as recited in claim 2, further comprising:
determining that the first image data is associated with a first portion of video data, the first portion of the video data representing a first frame generated at the first time;
identifying the second image data as being associated a second portion of the video data, the second portion of the video data representing a second frame generated at a second time that precedes the first time; and
identifying the third image data as being associated with a third portion of the video data, the third portion of the video data representing a third frame generated at a third time that is subsequent to the first time.

4. The method as recited in claim 1, further comprising:
determining a first number of images that is associated with the second result;
determining a second number of images that is associated with a third result; and
determining that the first number of images is greater than the second number of images,
and wherein associating the first image data with the second result is based at least in part on the first number of images being greater than the second number of images.

5. The method as recited in claim 1, further comprising:
receiving video data from an electronic device, the video data representing at least a first frame and a second frame;
receiving the first image data from the electronic device, the first image data representing at least a portion of the first frame that depicts the identifier; and
receiving the second image data from the electronic device, the second image data representing at least a portion of the second frame that depicts the identifier.

6. The method as recited in claim 1, further comprising:
determining one or more characteristics associated with the second result; and
verifying the second result using the one or more characteristics,
and wherein associating the first image data with the second result is further based on at least in part on verifying the second result.

7. The method as recited in claim 1, further comprising:
analyzing the first image data to determine at least one of:
that the first image data represents an entirety of the first result;
that the first image data represents an entirety of the identifier;
that a size of the identifier as represented by the first image data satisfies a threshold size; or
that a quality of the identifier as represented by the first image data satisfies a threshold quality; and
determining, based at least in part on analyzing the first image data, to further process the first image data.

8. The method as recited in claim 1, further comprising:
storing first additional data associated with the first image data, the first additional data representing at least:
the first result;
the first confidence level; and
a first indicator associated with a first frame represented by video data, the first frame being associated with the first time; and
storing second additional data associated with the second image data, the second additional data representing at least:
the second result;
the second confidence level; and
a second indicator associated with a second frame represented by the video data, the second frame being associated with the second time.

9. The method as recited in claim 1, further comprising:
sending the second classifier to a mobile apparatus that includes one or more imaging devices that generated the first image data and the second image data.

10. The method as recited in claim 1, further comprising:
receiving the first image data from a mobile apparatus;
receiving, from the mobile apparatus, first data indicating that the first image data was generated by a first camera of the mobile apparatus;
receiving the second image data from the mobile apparatus; and
receiving, from the mobile apparatus, second data indicating that the second image data was generated by a second camera of the mobile apparatus.

11. The method as recited in claim 1, wherein the identifier is a barcode, the first result is a first string of characters, and the second result is a second string of characters, and wherein the method further comprises:
determining a number of characters that differ between the first string of characters and the second string of characters; and
determining that the number of characters satisfies a threshold number,
and wherein associating the first image data with the second string of characters is further based at least in part on the number of characters satisfying the threshold number.

12. The method as recited in claim 1, wherein:
the identifier is a barcode;
the first result is a first string of characters;
the second result is a second string of characters; and
the method further comprises determining that the first image data represents the second string of character based at least in part on the second confidence level being equal to or greater than the threshold confidence level.

13. A system comprising:
one or more processors; and
one or more non-transitory computer-readable media storing instructions that, when executed by the one or more processors, cause the one or more processors to perform operations comprising:
receiving first image data representing an identifier;
receiving second image data representing the identifier;
determining a first confidence level associated with the first image data, the first confidence level associated with a first result for the identifier as determined by a first classifier using the first image data;
determining that the first confidence level is less than a threshold confidence level;
determining that the first image data is associated with a first frame represented by video data;
determining that the second image data is associated with a second frame represented by the video data, the second frame being associated with the first frame;
determining a second confidence level associated with the second image data, the second confidence level associated with a second result for the identifier as determined by the first classifier using the second image data;
determining that the second confidence level is equal to or greater than the threshold confidence level;
based at least in part on the second confidence level being equal to or greater than the threshold confidence level, associating the first image data with the second result; and
generating a second classifier by at least training the first classifier using the first image data and the second result.

14. The system as recited in claim 13, the operations further comprising:
receiving first additional data associated with the first image data, the first additional data representing at least:
the first result;
the first confidence level; and
the first frame; and
receiving second additional data associated with the second image data, the second additional data representing at least:
the second result;
the second confidence level; and
the second frame.

15. The system as recited in claim 13, the operations further comprising:
receiving third image data representing the identifier;
determining a third confidence level associated with the third image data, the third confidence level associated with the second result for the identifier as determined by the first classifier using the third image data; and
determining that the third confidence level is equal to or greater than the threshold confidence level,
and wherein determining that the second image data is associate with the second result is further based at least in part on the third confidence level being equal to or greater than the threshold confidence level.

16. The system as recited in claim 13, the operations further comprising:
determining that the second frame precedes the first frame;
determining that the third image data is associated with a third frame represented by the video data; and
determining the third frame is subsequent to the first frame.

17. The system as recited in claim 13, the operations further comprising:
determining a first number of images that is associated with the first result;
determining a second number of images that is associated with the second result; and
determining that the first number of images is greater than the second number of images,
and wherein determining that the first image data is associated with the second result is based at least in part on the first number of images being greater than the second number of images.

18. A system comprising:
one or more processors; and
one or more non-transitory computer-readable media storing instructions that, when executed by the one or more processors, cause the one or more processors to perform operations comprising:
storing first image data representing an identifier;
storing second image data representing the identifier;
determining a first confidence level associated with the first image data, the first confidence level associated with a first result for the identifier as determined by a first classifier using the first image data;
determining that the first confidence level is less than a threshold confidence level;
determining that the first image data is associated with a first time;
determining that the second image data is associated with a second time, the second time being associated with the first time;

based at least in part on the second time being associated with the first time, determining a second confidence level associated with the second image data, the second confidence level associated with a second result for the identifier as determined by the first classifier using the second image data;

determining that the second confidence level is equal to or greater than the threshold confidence level;

based at least in part on the second confidence level being equal to or greater than the threshold confidence level, associating the first image data with the second result; and generating a second classifier by at least training the first classifier using the first image data and the second result.

19. The system as recited in claim 18, further operations further comprising:

storing third image data representing the identifier;

determining a third confidence level associated with the third image data, the third confidence level associated with a third result for the identifier as determined by the first classifier using the third image data;

determining that the third confidence level is equal to or greater than the threshold confidence level; and determining that the first image data represents the second result based at least in part on both the second confidence level and the third confidence level being equal to or greater than the threshold confidence level.

20. The system as recited in claim 18, further operations further comprising:

determining that the first image data is associated with a first portion of video data, the first portion of the video data representing a first frame generated at the first time;

identifying the second image data as being associated a second portion of the video data, the second portion of the video data representing a second frame generated at a second time that precedes the first time; and identifying the third image data as being associated with a third portion of the video data, the third portion of the video data representing a third frame generated at a third time that is subsequent to the first time.

* * * * *